United States Patent
Tamano

(10) Patent No.: US 9,807,152 B2
(45) Date of Patent: Oct. 31, 2017

(54) DISTRIBUTED PROCESSING DEVICE AND DISTRIBUTED PROCESSING SYSTEM AS WELL AS DISTRIBUTED PROCESSING METHOD

(71) Applicant: NEC Corporation, Minato-ku, Tokyo (JP)

(72) Inventor: Hiroshi Tamano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 211 days.

(21) Appl. No.: 14/417,589

(22) PCT Filed: Apr. 26, 2013

(86) PCT No.: PCT/JP2013/062479
§ 371 (c)(1),
(2) Date: Jan. 27, 2015

(87) PCT Pub. No.: WO2014/020959
PCT Pub. Date: Feb. 6, 2014

(65) Prior Publication Data
US 2015/0215379 A1    Jul. 30, 2015

(30) Foreign Application Priority Data
Jul. 30, 2012  (JP) ................. 2012-168698

(51) Int. Cl.
H04L 29/08   (2006.01)
G06F 9/50    (2006.01)
G06F 9/54    (2006.01)

(52) U.S. Cl.
CPC ........... *H04L 67/10* (2013.01); *G06F 9/50* (2013.01); *G06F 9/54* (2013.01); *H04L 67/125* (2013.01); *H04L 67/34* (2013.01)

(58) Field of Classification Search
CPC ... G06F 9/50; G06F 9/54; H04L 67/34; H04L 67/125; H04L 67/10
See application file for complete search history.

(56) References Cited

U.S. PATENT DOCUMENTS 6,275,845 B1    8/2001  Tamura
6,334,138 B1 *  12/2001  Kureya ............. G06F 15/17368
                                                     709/201

FOREIGN PATENT DOCUMENTS

EP    0942377 A1    9/1999
JP    H11-110362 A  4/1999
(Continued)

OTHER PUBLICATIONS

Keith B. Hall, Scott Gilpin, Gideon Mann, "MapReduce/Big table for Distributed Optimization", NIPS LCCC Workshop 2010. Cited in the Specification.
(Continued)

*Primary Examiner* — Kim T Nguyen

(57) ABSTRACT

In a distributed processing device, there are provided: a collective communication means in which at least one activated process executes a local collective communication among a plurality of processes within one process group among a plurality of process groups generated by partitioning the plurality of processes by a first partitioning pattern; and a communication control means for selecting, after the local collective communication, a second partitioning pattern different from the first partitioning pattern used in the local collective communication and allowing the collective communication means to execute a next local collective communication using data based on a result of the local collective communication among a plurality of processes within one process group among a plurality of process
(Continued)

groups generated by partitioning the plurality of processes by the second partitioning pattern.

14 Claims, 14 Drawing Sheets

(56) References Cited

FOREIGN PATENT DOCUMENTS

| JP | H11-134311 A | | 5/1999 |
|---|---|---|---|
| JP | H11-259441 A | | 9/1999 |
| JP | 2009-193255 | * | 8/2009 |
| JP | 2009-193255 A | | 8/2009 |
| JP | 2011-53876 A | | 3/2011 |
| JP | 2012-98881 A | | 5/2012 |

OTHER PUBLICATIONS

Ryan McDonald, Keith Hall, Gideon Mann, "Distributed Training Strategies for the Structured Perceptron", Human Language Technologies, The 2010 Annual Conference of the North American Chapter of the ACL, pp. 456-464, Los Angeles, California, Jun. 2010. Cited in the Specification.
Jeffrey Dean, Sanjay Ghemawat, "MapReduce: Simplified Data Processing on Large Clusters", USENIX Association, 6th Symposium on Operating Systems Design and Implementation, Jan. 2008. Cited in the Specification.
International Search Report for PCT Application No. PCT/JP2013/062479, dated Aug. 6, 2013.
Bala V et al: "CCL: A Portable and Tunable Collective Communication Library for Scalable Parallel Computers", IEEE Transactions on Parallel and Distributed Systems, IEEE Service Enter, Los Alamitos, CA. US, vol. 6, No. 2. Feb. 1, 1995 (Feb. 1, 1995). pp. 154-163, XP000488024, ISSN: 1045-9219, DOI: 10.1109/71.342126. Cited in EESR.
Bonorden O et al: "The Paderbom University BSP (PUB) library", Parallel Computing, Elsevier Publishers, Amsterdam, NL, vol. 29, No. 2, Feb. 1, 2003 (Feb. 1, 2003), pp. 187-207, XP004401855, ISSN: 0167-8191, DOI: 10.1016/S0167-8191(02)00218-1. Cited in EESR.
The extended European Search Report of EP Application No. EP13826186 dated Feb. 11, 2016.

* cited by examiner

Fig.5
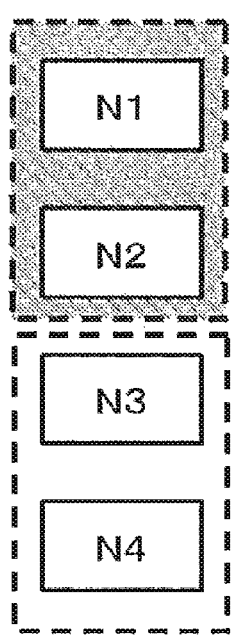
PARTITIONING
PATTERN A-1
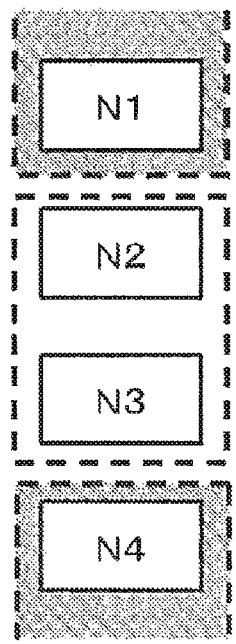
PARTITIONING
PATTERN A-2
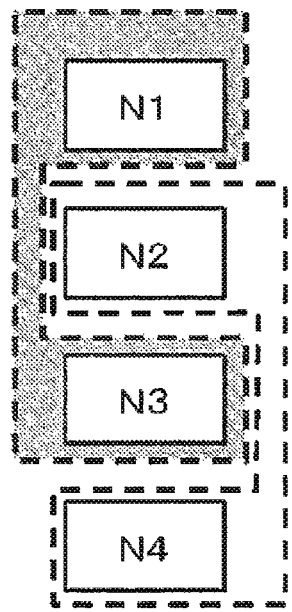
PARTITIONING
PATTERN A-3

Fig.6
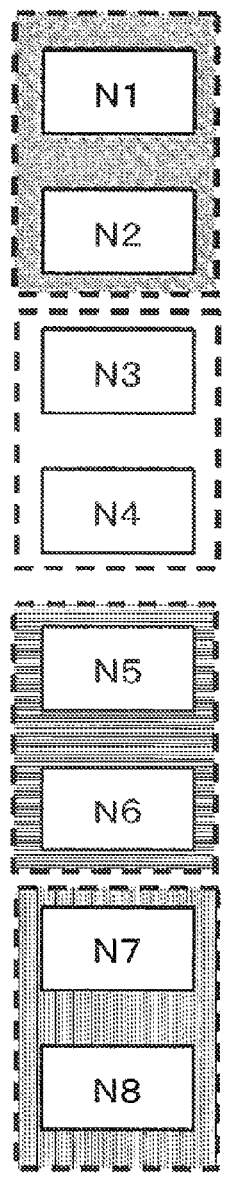
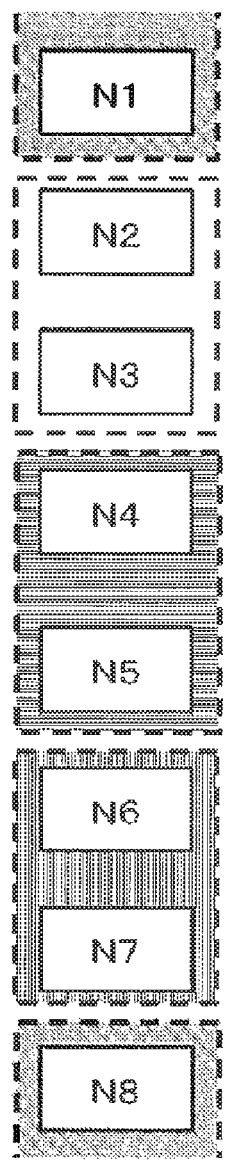
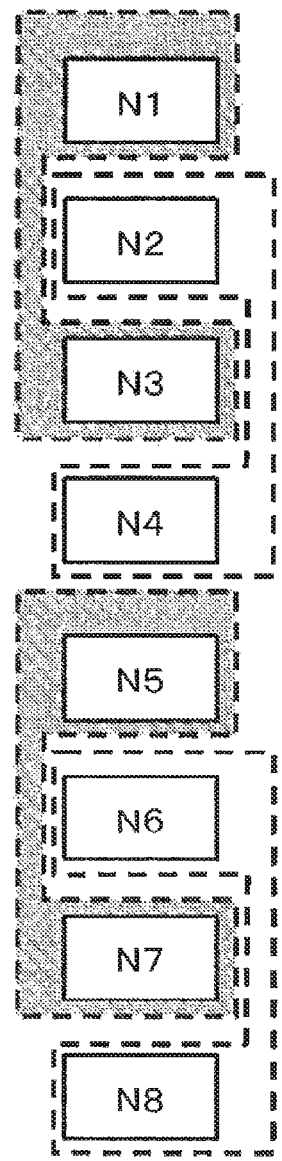
PARTITIONING
PATTERN B-1
PARTITIONING
PATTERN B-2
PARTITIONING
PATTERN B-3

Fig.7
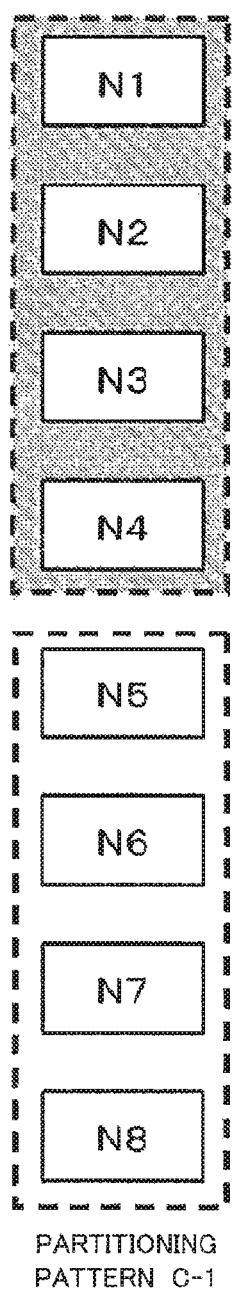 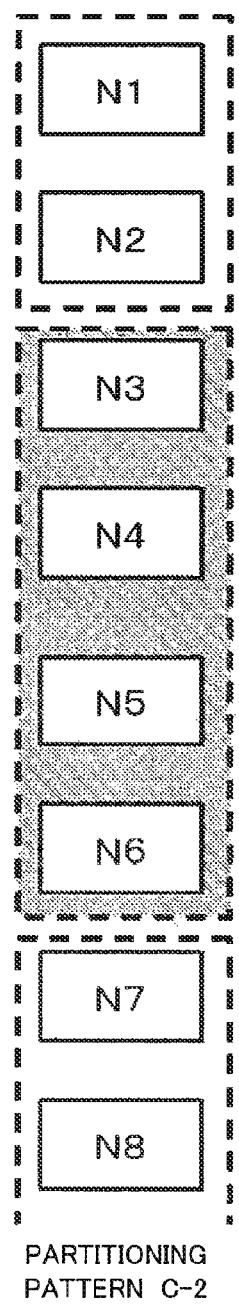 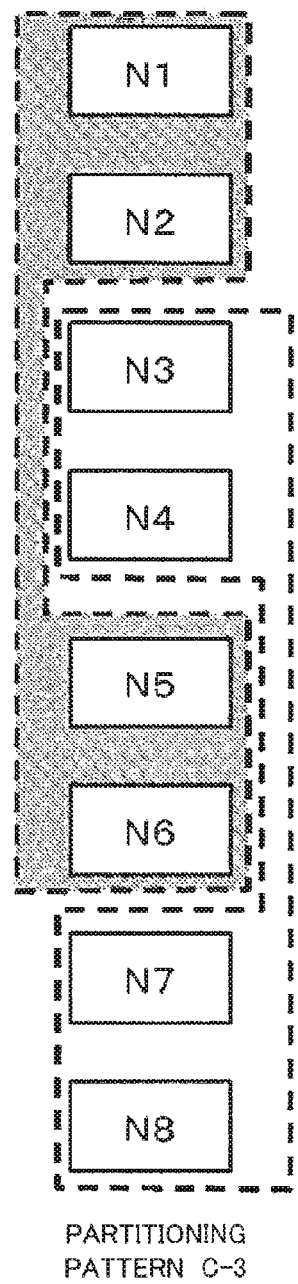
PARTITIONING　　　PARTITIONING　　　PARTITIONING
PATTERN C-1　　　PATTERN C-2　　　PATTERN C-3

DISTRIBUTED PROCESSING DEVICE AND DISTRIBUTED PROCESSING SYSTEM AS WELL AS DISTRIBUTED PROCESSING METHOD

This application is a National Stage Entry of PCT/JP2013/062479 filed on Apr. 26, 2013, which claims priority from Japanese Patent Application 2012-168698 filed on Jul. 30, 2012, the contents of all of which are incorporated herein by reference, in their entirety.

TECHNICAL FIELD

The present invention relates to distributed processing technology accompanied by a collective communication.

BACKGROUND ART

Machine learning and data mining are both a method of finding a rule or a pattern from data and used in various scenes such as information recommendation, face authentication, voice recognition, and document classification. Various methods have been proposed for such machine learning and data mining. Many of the proposed methods design a model that describes data, generate a function (e.g., log-likelihood) representing a degree of description with regard to the model, and optimize (maximization, in a case where the function to be used is the log-likelihood) a model parameter of the function, whereby learning is performed.

For example, a steepest descent method, a probabilistic gradient-descent method, an EM (Expectation Maximization) algorithm, and the like are used for the above maximization. The greater the number of pieces of data to be learned, the longer a time required for the optimization, so that parallel and distributed processing are desirably applied to large-scale data learning.

As a method that performs the optimization in a parallel and distributed fashion, a DGD (Distributed Gradient Descent) method and an IPM (Iterative Parameter Mixtures) method are proposed (see Non Patent Literatures 1 and 2 listed below). The DGD method is a method that performs the steepest descent method by parallel distributed method. The DGD method partitions data into N pieces, calculates in parallel a gradient of the sub data set in each of the partitions, adds the calculated gradients to obtain a gradient, and updates a model based on the gradient. The DGD method is an iterative algorithm and, therefore, the above processing is repeated until convergence is reached. The IPM method partitions data into N pieces and applies in parallel the probabilistic gradient-descent method to each partitioned data. As a result, N different models are calculated and then averaged. The IPM method is also an iterative algorithm and, therefore, the above processing is repeated until convergence is reached.

Non Patent Literature 1 listed below shows an experimental result that the IPM method provides high-speed processing for the optimization in structured perceptron or a maximum entropy method. Further, when the DGD method or IPM method is implemented, MapReduce (see Non Patent Literature 3), which is a distributed processing framework, can be used. Thus, the DGD method and IPM method are advantageous in that they can be easily implemented even by users not familiar with distributed programming.

CITATION LIST

Non Patent Literature

NPL 1: Keith B. Hall, Scott Gilpin, Gideon Mann, "MapReduce/Big table for Distributed Optimization", NIPS LCCC Workshop 2010

NPL 2: Ryan McDonald, Keith Hall, Gideon Mann, "Distributed Training Strategies for the Structured Perceptron", Human Language Technologies, The 2010 Annual Conference of the North American Chapter of the ACL, pages 456-464, Los Angeles, Calif., June 2010

NPL 3: Jeffrey Dean, Sanjay Ghemawat, "MapReduce: Simplified Data Processing on Large Clusters", USENIX Association, 6th Symposium on Operating Systems Design and Implementation, 2004

SUMMARY OF INVENTION

Technical Problem

However, the above-described DGD method and IPM method have the following problem. The algorithm of the DGD method and IPM method includes processing of adding the gradients of all the distributed model parameters. When this processing is executed, communication occurs in all machines to which data is distributed. Such communication becomes a bottleneck to restrict an enhancement in processing speed even if the number of machines is increased for the distributed processing. That is, Reduce in the MapReduce as the distributed processing framework, or Allreduce in MPI (Message Passing Interface) becomes a processing bottleneck.

The present invention has been made in view of the above situation, and object thereof is to provide technology capable of executing, at high-speed, distributed processing accompanied by a collective communication.

Solution to Problem

To solve the above problem, the following configurations are adopted in respective aspects of the present invention.

A first aspect relates to a distributed processing device that activates at least one of a plurality of processes activated by a plurality of distributed processing devices. In the distributed processing device according to the first aspect, at least one activated process includes: a collective communication means in which said plurality of processes execute a local collective communication among a plurality of processes within one process group among a plurality of process groups generated by partitioning the plurality of processes by a first partitioning pattern; and a communication control means for selecting, after the local collective communication, a second partitioning pattern different from the first partitioning pattern used in the local collective communication and allowing the collective communication means to execute a next local collective communication using data based on a result of the local collective communication among a plurality of processes within one process group among a plurality of process groups generated by partitioning the plurality of processes by the second partitioning pattern.

A second aspect relates to a distributed processing method that is executed on a computer that activates at least one of a plurality of processes activated by a plurality of computers. The distributed processing method according to the second aspect includes the followings: the computer executes a local collective communication among a plurality of processes within one process group among a plurality of process groups generated by partitioning the plurality of processes by a first partitioning pattern; selects, after the local collective communication, a second partitioning pattern different from the first partitioning pattern used in the local collective communication; and executes, using data based on a result of the local collective communication, a next local collective communication among a plurality of processes within one process group among a plurality of process groups generated by partitioning the plurality of processes by the second partitioning pattern.

A distributed processing system according to a third aspect includes: a plurality of distributed processing devices according to the first aspect; and a distributed processing management device including: an information storage unit that stores, for each distributed processing device, at least one of the number of processor cores and connected network information; an execution target determination unit that preferentially selects a distributed processing device that activates at least one of the plurality of processes from at least one of a distributed processing device having the same connected network information and a distributed processing device having a larger number of processor cores; and an execution instruction unit that transmits an execution instruction of the process to each distributed processing device selected by the execution target determination unit.

Another aspect of the present invention may be a program that allows a computer to execute the configuration according to the first aspect or may be a computer-readable recording medium that records therein such a program. The recording medium includes a non-transitory physical medium.

Advantageous Effects of Invention

According to the above aspects, it is possible to provide technology that executes at high-speed the distributed processing accompanied by the collective communication.

BRIEF DESCRIPTION OF DRAWINGS

The above and other objects, features, and advantages of the present invention will become apparent from the following preferred exemplary embodiments and drawings accompanied thereby.

FIG. 5 is a view illustrating an example of three partitioning patterns set for four processes;

FIG. 6 is a view illustrating an example of three partitioning patterns set for eight processes;

FIG. 7 is a view illustrating an example of three partitioning patterns set for eight processes;

DESCRIPTION OF EMBODIMENTS

Figure 1:
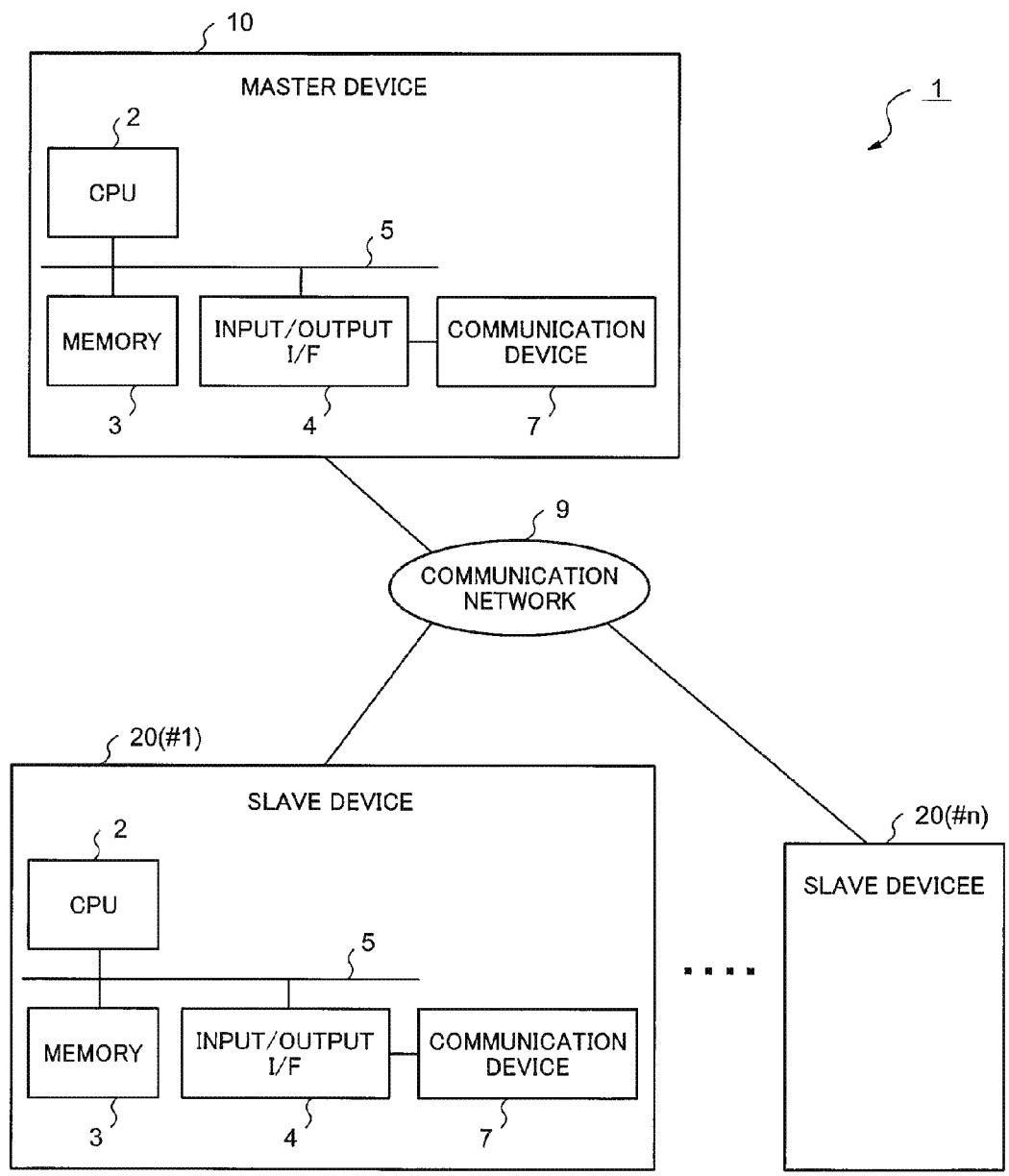
FIG. 1 is a view conceptually illustrating a configuration example of a distributed processing system in a first exemplary embodiment.

Hereinafter, exemplary embodiments of the present invention will be described. It should be noted that the following exemplary embodiments are illustrative, and the present invention is not limited to configurations of the following exemplary embodiments.

A distributed processing device according to the present exemplary embodiment activates at least one of a plurality of processes activated by a plurality of distributed processing devices. In the distributed processing device according to the present exemplary embodiment, at least the one process includes a collective communication means and a communication control means. The collective communication means executes a local collective communication among a plurality of processes within one process group among a plurality of process groups generated by partitioning the plurality of processes by a first partitioning pattern. The communication control means selects, after the local collective communication, a second partitioning pattern different from the first partitioning pattern used in the local collective communication. And then the communication control means allows the collective communication means to execute a next local collective communication using data based on a result of the local collective communication among a plurality of processes within one process group among a plurality of process groups generated by partitioning the plurality of processes by the second partitioning pattern.

A distributed processing method according to the present exemplary embodiment is executed on a computer that activates at least one of a plurality of processes activated by a plurality of computers. The distributed processing method according to the present exemplary embodiment includes the followings: First, the computer executes a local collective communication among a plurality of processes within one process group among a plurality of process groups generated by partitioning the plurality of processes by a first partitioning pattern; second, the computer selects, after the local collective communication, a second partitioning pattern different from the first partitioning pattern used in the local collective communication; and third, the computer executes, using data based on a result of the local collective communication, a next local collective communication among a plurality of processes within one process group among a plurality of process groups generated by partitioning the plurality of processes by the second partitioning pattern.

The above partitioning pattern refers to a grouping method of partitioning the plurality of processes into groups. Thus, the second partitioning pattern different from the first partitioning pattern refers to another grouping method different from a grouping method corresponding to the first partitioning pattern.

The plurality of processes execute structured perceptron or a maximum entropy method in a distributed manner. It is clear from the following reference that the present exemplary embodiment is effective in distributed learning processing using the maximum entropy method. Reference: Gideon Mann, Ryan McDonald, Mehryar Mohri, "Efficient Large-Scale Distributed Training of Conditional Maxmum Entropy Models", NIPS, 2009. Further, the above process refers to an arbitrary execution unit of software (program) and is not a term used for distinction from a thread, a task, and the like.

The above collective communication means that predetermined processing is applied to a plurality of pieces of data to be processed that a plurality of processes have and the resultant data is distributed to the plurality of processes. In this collective communication, a process that collects the plurality of pieces of data to be processed from the plurality of processes and applies predetermined processing to the collected pieces of data may be a single process or a plurality of processes. The predetermined processing itself undergoes no restriction and includes, for example, addition, and the like.

In the present exemplary embodiment, a local collective communication is executed in each of process groups generated by partitioning a plurality of processes by the first partitioning pattern. In the local collective communication in the present exemplary embodiment, the collective communication is executed targeting only the process existing in each process group. Thus, in the local collective communication, a communication among the processes belonging to different process groups does not occur.

After completion of the local collective communication in each process group, data obtained by applying the predetermined processing to a plurality of pieces of data to be processed that the plurality of processes in each process group have is shared among the plurality of processes within each process group. Hereinafter, the data obtained by applying the predetermined processing to a plurality of pieces of data to be processed that the plurality of processes in each process group have is sometimes referred to as local processing data. That is, according to the present exemplary embodiment, the local processing data reflecting the pieces of data to be processed that the processes in each process group have is shared in each process group through the local collective communication executed for each process group.

In the present exemplary embodiment, a second partitioning pattern different from the first partitioning pattern used in a previous local collective communication is selected for a next local collective communication. Then, the next local collective communication is executed in each of the process groups corresponding to the second partitioning pattern, using data based on a result of the previous local collective communication. The next local collective communication may be executed using the local processing data obtained through the previous local collective communication as it is. Alternatively, the next local collective communication may be executed using data obtained as a result of further processing that each process applies to the local processing data obtained through the previous local collective communication. Specifically, in the next local collective communication, predetermined processing is applied to a plurality of pieces of data to be processed each reflecting a result of the previous local collective communication that a plurality of processes in a new process group have. Then, data obtained through the predetermined processing is delivered to the plurality of processes in the new process group. The second partitioning pattern differs from the first partitioning pattern, so that, in the next local collective communication, each process communicates with at least one process that is not included in the previous local collective communication as a local collective communication partner. Further, in the next local collective communication, each process has the local processing data reflecting pieces of data to be processed that other processes belonging to the same process group in the previous local collective communication have or data obtained by applying further processing to the local processing data. Thus, after completion of the next local collective communication, each process has local processing data reflecting more pieces of data to be processed than those upon completion of the previous local collective communication.

According to the present exemplary embodiment, by repeating such a local collective communication, it is possible to obtain desired data reflecting all pieces of data to be processed which are distributed to and arranged in a plurality of processes. However, in the present exemplary embodiment, a method for obtaining desired data is not limited to the repetition of only the local collective communication.

Further, according to the present exemplary embodiment, not a communication among all the processes, but a local intra-collective communication is executed, so that it is possible to prevent the communication from becoming a bottleneck to hinder high-speed operation of the distributed processing. As a result, according to the present exemplary embodiment, it is possible to overcome a limitation imposed on high-speed operation due to a communication load, thus making it possible to realize high-speed operation of the distributed processing accompanied by the collective communication.

Hereinafter, the above exemplary embodiment will be described more in detail.

First Exemplary Embodiment

System Configuration

FIG. 1 is a view conceptually illustrating a configuration example of a distributed processing system in a first exemplary embodiment. The distributed processing system 1 in the first exemplary embodiment includes a master device 10 and a plurality of slave devices 20 (#1, #2, . . . , #n). Hereinafter, the slave devices 20 (#1, #2, . . . , #n) are collectively referred to as slave devices 20 unless there is a need to distinguish one from another.

The slave devices 20 execute distributed processing accompanied by a collective communication. The above-described distributed processing device and distributed processing method are applied to the slave devices 20. Thus, the slave devices 20 can be each referred to also as a distributed processing device. The master device 10 makes the plurality of slave devices 20 execute the distributed processing according to a request from a user. Thus, the master device 10 can be referred to also as a distributed processing management device.

Although the master device 10 and slave devices 20 are distinguished from each other so as to distinguish a device that manages the distributed processing from another device, they need not necessarily be distinguished from each other. This is because both the master device 10 and slave devices 20 can actually execute a distributed processing program in the distributed processing system 1. However, in the following description, it is defined, for descriptive convenience, that only the slave devices 20 can actually execute the distributed processing program.

The master device 10 and slave devices 20 are communicably connected to each other via a communication network 9. The communication network 9 includes a public network such as Internet, a WAN (Wide Area Network), a LAN (Local Area Network), a wireless communication network, and the like. In the present exemplary embodiment, a communication mode between the master device 10 and slave devices 20 and between the slave devices 20 is not limited.

The master device 10 and slave devices 20 are each so-called a computer and each have a CPU (Central Processing Unit) 2, a memory 3, an input/output interface (I/F) 4, and the like which are connected by a bus 5. The memory 3 is a RAM (Random Access Memory), a ROM (Read Only Memory), a hard disk, a portable storage medium, or the like. The input/output I/F 4 is connected to a communication device 7 and the like that perform communication with other computers (master device 10 and slave devices 20) via the communication network 9. Further, the input/output I/F 4 may be connected to an input unit (not illustrated) or an output unit (not illustrated). The input unit is a device, such as a keyboard or a mouse, that receives a user operation. The output device is a device, such as a display device or a printer, that provides information to a user.

Hardware configurations of the respective master device 10 and slave devices 20 are not limited. Although the master device 10 and slave devices 20 each have one CPU 2 in FIG. 1, they may each have a plurality of CPUs 2.

Device Configuration (Master Device)

Figure 2:
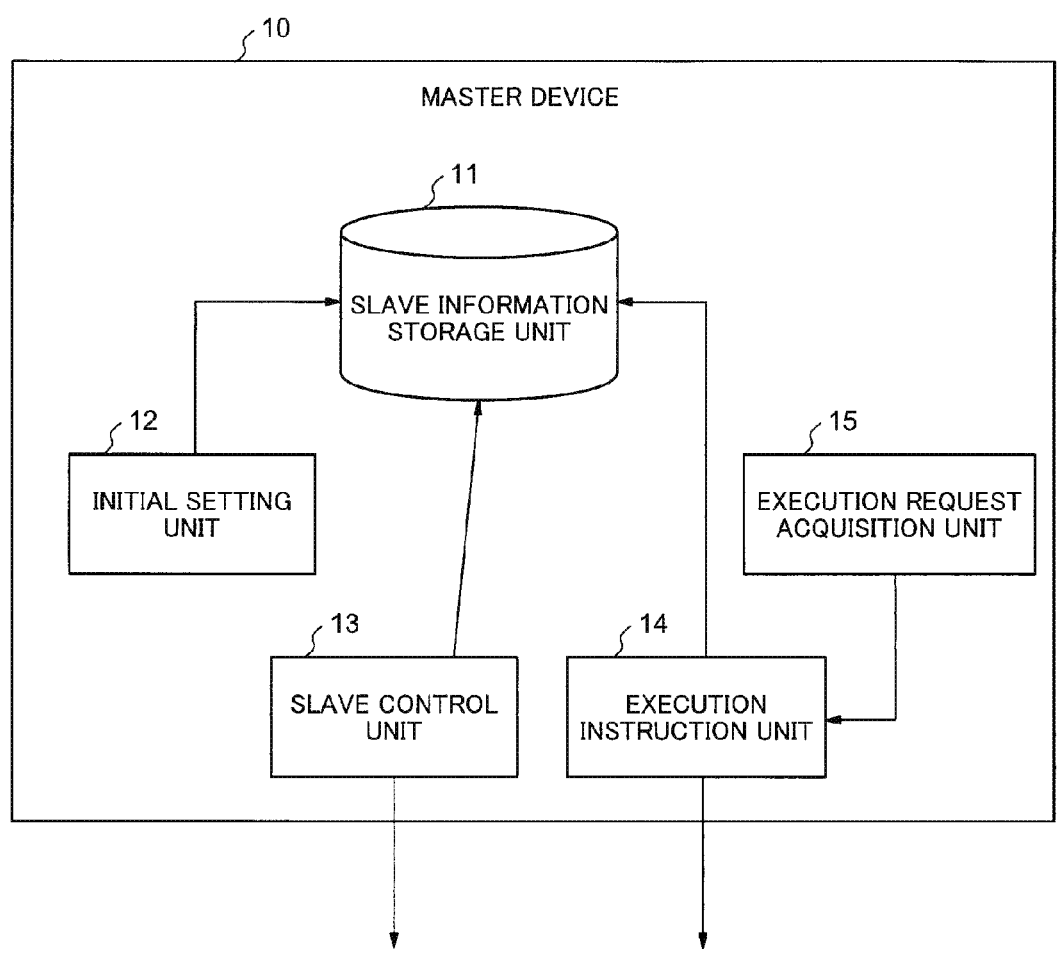
FIG. 2 is a view conceptually illustrating a configuration example of a master device in the first exemplary embodiment.

FIG. 2 is a view conceptually illustrating a configuration example of the master device 10 in the first exemplary embodiment. As illustrated in FIG. 2, the master device 10 includes a slave information storage unit 11, an initial setting unit 12, a slave control unit 13, an execution instruction unit 14, an execution request acquisition unit 15, and the like. Functions of these processing units are realized, for example, by the CPU 2 executing a program stored in the memory 3. The program is installed from, for example, a portable recording medium, such as a CD (Compact Disc) or a memory card, or another computer on a network, via the input/output I/F 4 and stored in the memory 3.

The slave information storage unit 11 stores various information related to each of the slave devices 20, such as a machine name and an IP address, that the master device 10 uses to identify the individual slave devices 20 and to communicate with the slave devices 20. In a case where a DNS (Domain Name System) service is used, only the machine name needs to be stored.

The initial setting unit 12 performs initial setting of the master device 10. The initial setting unit 12 stores, after start-up of the master device 10, the above-described information related to the slave devices 20 specified by a user in the slave information storage unit 11. The information related to the slave devices 20 may be input by the user operating the input unit or acquired from a setting file generated by the user.

The slave control unit 13 performs start and stop of the plurality of slave devices 20 based on the information related to the individual slave devices 20 stored in the slave information storage unit 11.

The execution request acquisition unit 15 acquires an execution request of the distributed processing program. For example, in this execution request, the distributed processing program to be executed in the plurality of slave devices 20 is specified. The execution request may include the number of processes to be executed by the distributed processing program. When the distributed processing program or the number of processes is not specified in the execution request, previously set information may be used as the distributed processing program or the number of processes. The execution request may be input from the input unit (not illustrated) or acquired from another computer.

The execution instruction unit 14 transmits the distributed processing execution request to each of the slave device 20. The execution instruction unit 14 determines the slave devices 20 to activate a process for the distributed processing and the number of processes to be activated in each of the slave devices 20 in accordance with the number of processes acquired by the execution request acquisition unit 15 and includes the determined information in an execution instruction.

(Slave Device)

Figure 3:
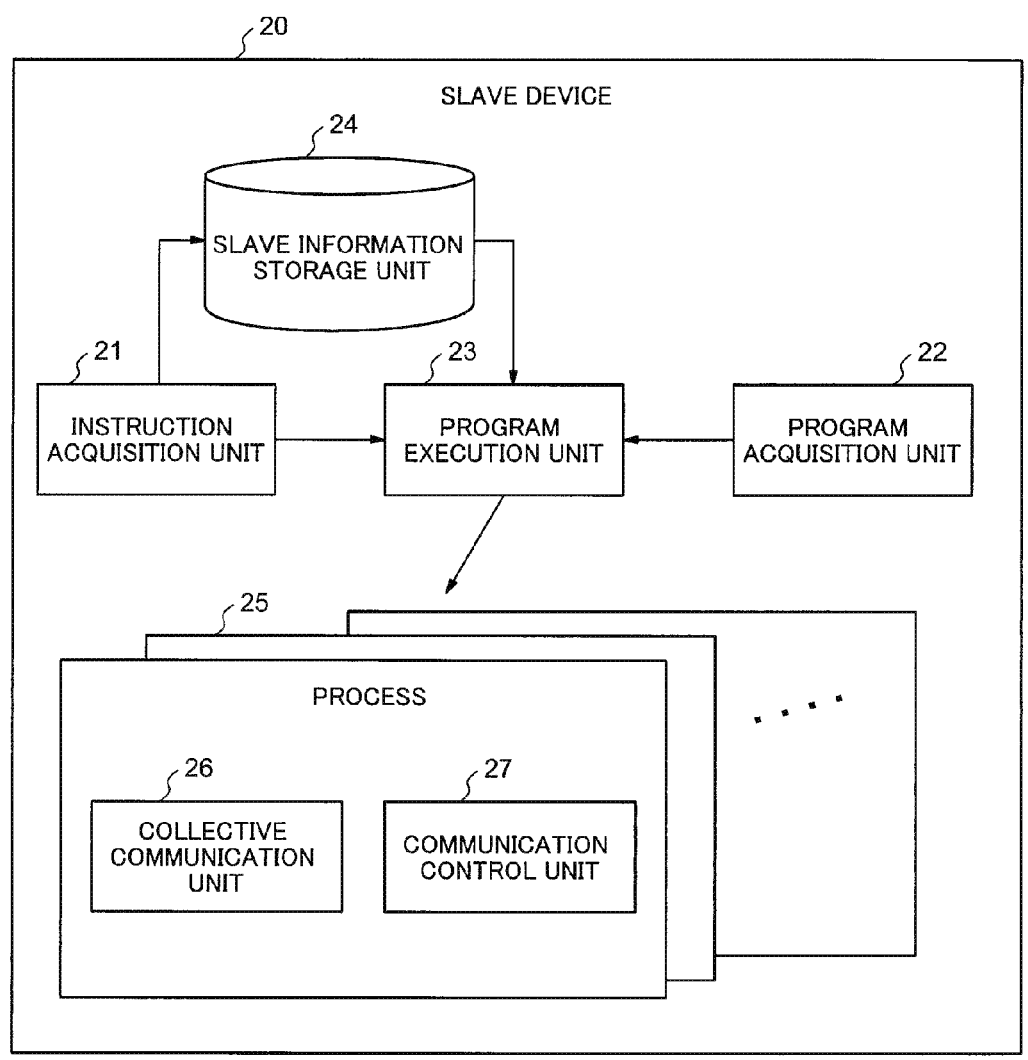
FIG. 3 is a view conceptually illustrating a configuration example of a slave device in the first exemplary embodiment.

FIG. 3 is a view conceptually illustrating a configuration example of each slave device 20 in the first exemplary embodiment. As illustrated in FIG. 3, the slave device 20 includes an instruction acquisition unit 21, a program acquisition unit 22, a program execution unit 23, a slave information storage unit 24, and the like. Functions of these processing units are realized, for example, by the CPU 2 executing a program stored in the memory 3. The program is installed from, for example, a portable recording medium, such as a CD or a memory card, or another computer on a network, via the input/output I/F 4 and stored in the memory 3.

The instruction acquisition unit 21 receives a distributed processing execution instruction from the master device 10. The execution instruction includes information of the distributed processing program to be executed, the number of processes to be activated, and information of the plurality of slave devices 20 to participate in the distributed processing. The instruction acquisition unit 21 stores the information of the slave devices 20 in the slave information storage unit 24.

The slave information storage unit 24 stores the information related to the plurality of slave devices 20 to participate in the distributed processing. Specifically, a machine name, an IP address, the number of processes to be activated, and the like of each slave device 20 to participate in the distributed processing are stored.

The program acquisition unit 22 acquires the distributed processing program specified by the distributed processing execution instruction received by the instruction acquisition unit 21. When location information of the distributed processing program is set in the execution instruction, the program acquisition unit 22 acquires the specified distributed processing program from another computer based on the location information. Alternatively, the distributed processing program may be transmitted, together with the execution instruction, from the master device 10.

The program execution unit 23 executes the distributed processing program acquired by the program acquisition unit 22 as many times as the number of processes specified in the execution instruction acquired by the instruction acquisition unit 21. At this time, the program execution unit 23 adds a unique ID to each process so as to distinguish the processes to be activated on the same slave device 20 from one another. Each process activated in each slave device 20 based on the distributed processing program and executing the distributed processing is referred to as a process 25. When receiving the distributed processing execution instruction from the master device 10, each slave device 20 generates at least one process 25.

The process 25 includes a collective communication unit 26, a communication control unit 27, and the like. The collective communication unit 26 and communication control unit 27 are realized by execution of the distributed processing program and can thus be referred to as a collective communication means and a communication control means, respectively.

The collective communication unit 26 executes a local collective communication among a plurality of processes within one process group among a plurality of process groups generated according to a given partitioning pattern, like the collective communication means of the distributed processing device in the above-described exemplary embodiment. The collective communication unit 26 executes, for example, the Allreduce in the MPI for only the plurality of processes in a given process group as a target.

Figure 4:
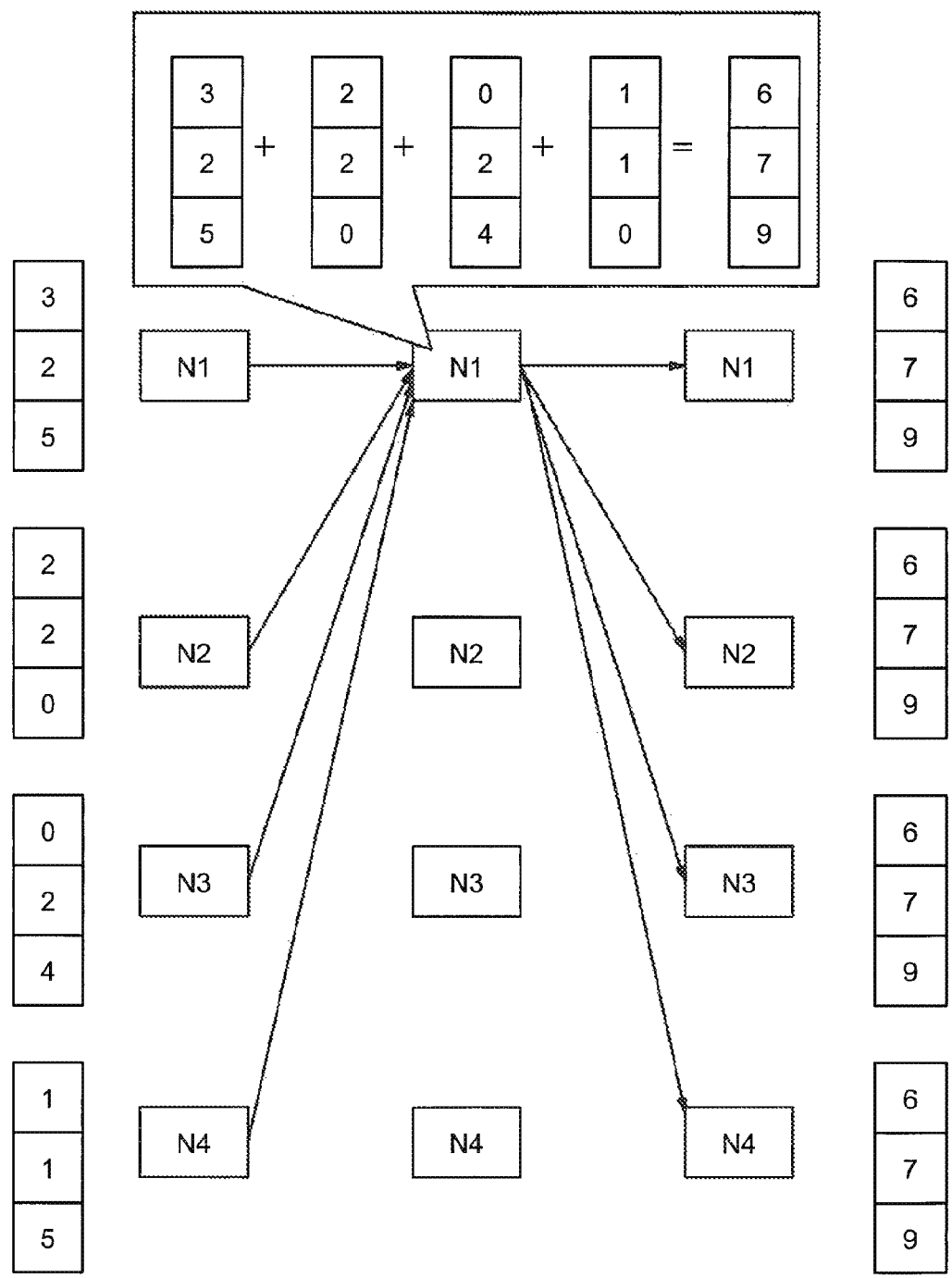
FIG. 4 is a view illustrating an example (addition) of Allreduce.

FIG. 4 is a view illustrating an example (addition) of the Allreduce. Reference numerals N1, N2, N3, and N4 each denote the process 25. That is, FIG. 4 illustrates an example in which four processes N1 to N4 exist in a given process group. Each process has an INT (integer) vector. In an example of FIG. 4, the collective communication unit 26 of the process N1 collects vectors from the other respective processes N2, N3, and N4 and adds elements of all the collected vectors. The collective communication unit 26 of the process N1 delivers a vector (6, 7, 9) obtained as a result of the addition to the other processes N2, N3, and N4.

As described above, local processing data reflecting all the pieces of data that all the processes in the process group have is shared among all the processes in the process group. In the example of FIG. 4, the pieces of data are collected to one process N1, and predetermined processing is executed in the process N1. Such implementation is simple but inefficient, so that a more efficient method such as one called Recursive Halving And Doubling may be employed.

The communication control unit 27 selects a partitioning pattern for determining a unit (process group) that executes the local collective communication, like the communication control means of the distributed processing device in the above-described exemplary embodiment. Specifically, the communication control unit 27 retains information related to a plurality of partitioning patterns that can be selected and information related to a selection order of the plurality of partitioning patterns. The communication control unit 27 selects a partitioning pattern to be used in a subsequent collective communication in such a manner that the partitioning pattern to be used in the subsequent collective communication differs from a partitioning pattern used in the previous local collective communication.

The following describes the partitioning patterns and the selection order of the partitioning patterns using FIGS. 5, 6, and 7. FIG. 5 is a view illustrating an example of three partitioning patterns set for four processes 25. In the example of FIG. 5, the four processes 25 are partitioned into two process groups each including two processes 25. The communication control unit 27 retains information related to the three partitioning patterns illustrated in FIG. 5. Further, after the local collective communication is repeated a predetermined number of times, the communication control unit 27 retains information related to the selection order that allows data reflecting a plurality of pieces of target data that the plurality of processes 25 have to be shared among the plurality of processes 25. In the partitioning pattern illustrated in FIG. 5, the following two selection orders can be retained.

Selection Order 1: Alternately selecting partitioning pattern A-1 and partitioning pattern A-2 in repetitive manner Selection Order 2: Sequentially selecting partitioning pattern A-1, partitioning pattern A-2, and partitioning pattern A-3 in repetitive manner A flow of data processing when the selection orders 1 and 2 are executed is as follows. Here, pieces of target data that the processes N1, N2, N3, and N4 have respectively are referred to as D1, D2, D3, and D4, respectively, and a computation result data reflecting the target data D1 and target data D2 is referred to as data D1D2. In a first step, the data D1D2 is shared between the processes N1 and N2 through the local collective communication between the processes N1 and N2, and data D3D4 is shared between the processes N3 and N4 through the local collective communication between the processes N3 and N4. In a subsequent step, data D1D2D3D4 is shared between the processes N1 and N4 through the local collective communication between the process N1 and process N4, and the data D1D2D3D4 is shared between the processes N2 and N3 through the local collective communication between the process N2 and process N3.

As described above, when the selection orders 1 and 2 are executed, the computation result data (D1D2D3D4) reflecting all the pieces of target data that the processes N1 to N4 have is shared among all the processes N1 to N4 through the two local collective communications.

FIG. 6 is a view illustrating an example of three partitioning patterns set for eight processes 25. In the example of FIG. 6, the eight processes 25 are partitioned into four process groups each including two processes 25. Here, there are 105 partitioning patterns (8!/(4!2!2!2!2!)=105) that partition the eight processes 25 into four process groups each of which includes two processes 25. Of the 105 partitioning patterns, three partitioning patterns are illustrated in FIG. 6. When the three partitioning patterns illustrated in FIG. 6 are used, the following two selection orders can be taken.

Selection Order 1: Alternately selecting partitioning pattern B-1 and partitioning pattern B-2 in repetitive manner Selection Order 2: Alternately selecting partitioning pattern B-2 and partitioning pattern B-3 in repetitive manner According to the selection orders 1 and 2, computation result data reflecting all the pieces of target data that the processes N1 to N8 have is shared among all the processes N1 to N8 through four steps, i.e., four local collective communications. Note that even when a selection order of sequentially selecting the partitioning pattern B-1, partitioning pattern B-2, and partitioning pattern B-3 in a repetitive manner is executed, it is possible to share the computation result data reflecting all the pieces of target data that the processes N1 to N8 have among all the processes N1 to N8 in several steps.

However, when the three partitioning patterns illustrated in FIG. 6 are used, no matter how many times the partitioning pattern B-1 and partitioning pattern B-3 are alternately repeated, it is impossible to share the computation result data reflecting all the pieces of target data that the processes N1 to N8 have among all the processes N1 to N8. Thus, the communication control unit 27 does not use such a selection order.

FIG. 7 is a view illustrating an example of three partitioning patterns set for eight processes 25. In the example of FIG. 7, the eight processes 25 are partitioned into two process groups each including four processes 25. Here, there are 35 partitioning patterns that partition the eight processes 25 into two process groups each of which includes four processes 25. Of the 35 partitioning patterns, three partitioning patterns are illustrated in FIG. 7. When the three partitioning patterns illustrated in FIG. 7 are used, it is possible to execute a selection order of alternately selecting any two of the partitioning patterns in a repetitive manner or a selection order of sequentially selecting the three partitioning patterns in a repetitive manner. According to the above selection orders, it is possible to share the computation result data reflecting all the pieces of target data that the processes N1 to N8 have among all the processes N1 to N8 in two steps.

The communication control unit 27 uses data based on a result of the previous local collective communication to make the collective communication unit 26 execute subsequent local collective communication among the plurality of processes within each of the plurality of process groups generated according to the partitioning pattern thus selected.

Operation Example

Figure 8:
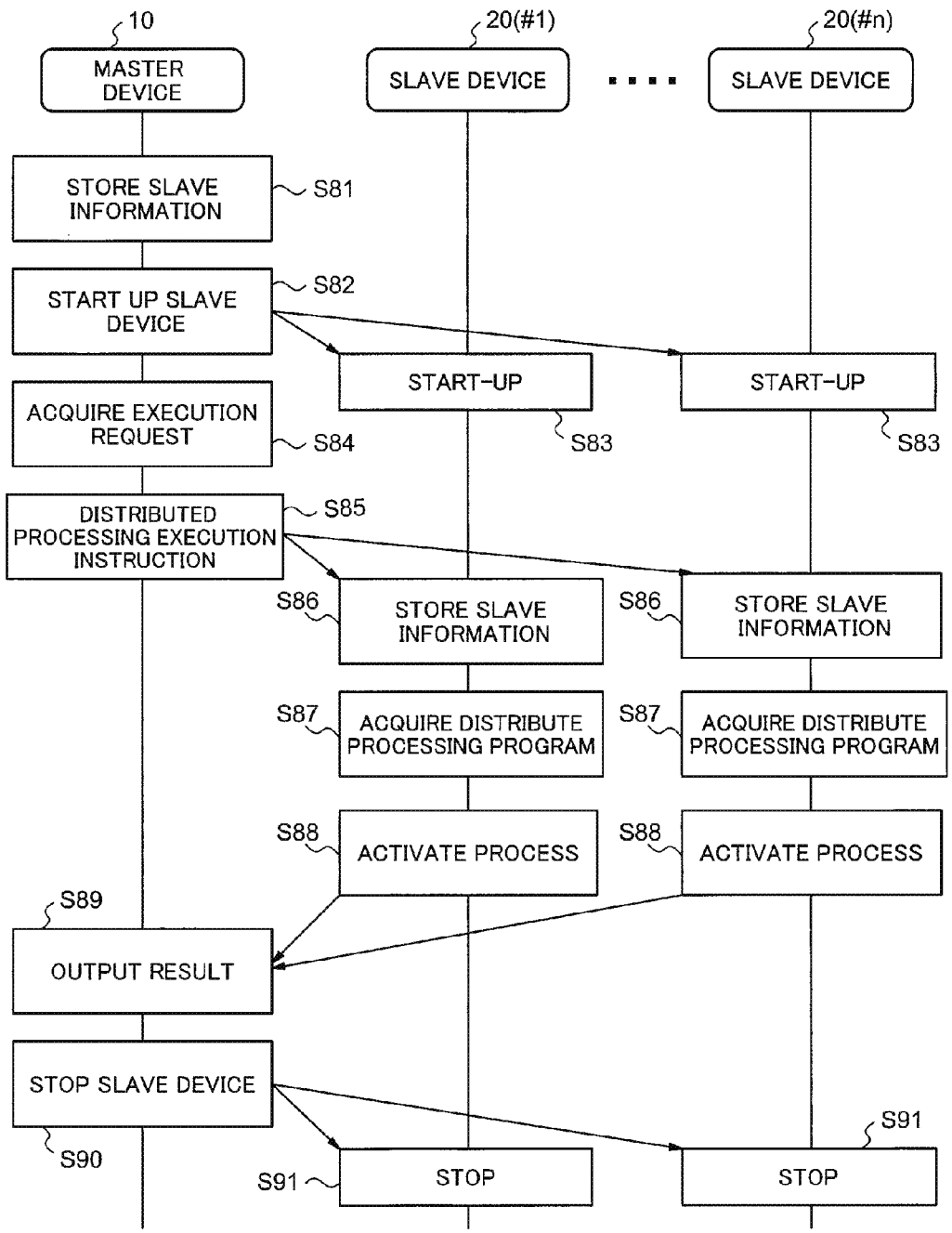
FIG. 8 is a view illustrating an operation example of the distributed processing system in the first exemplary embodiment.
Figure 9:
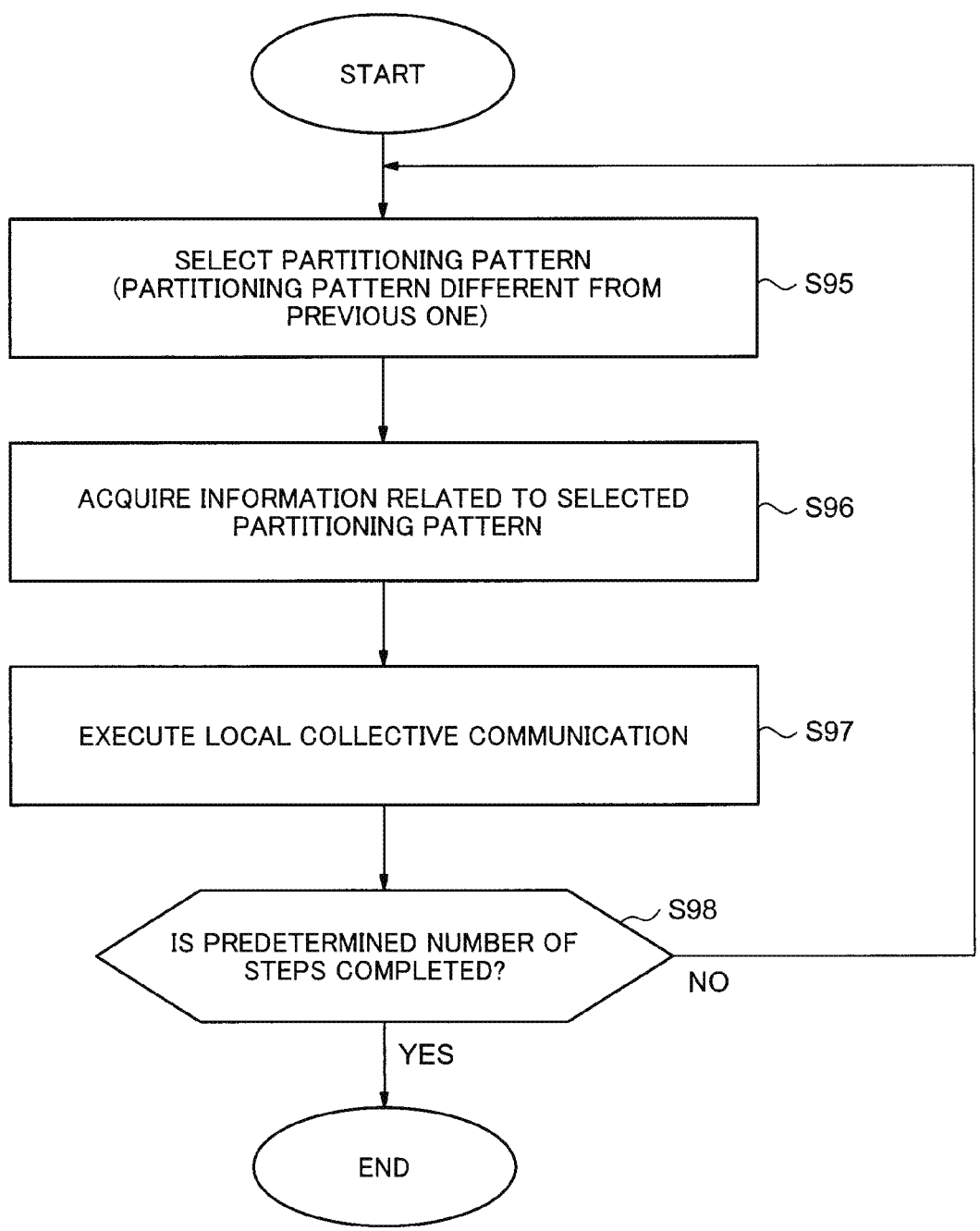
FIG. 9 is a flowchart illustrating an operation example of each process in the first exemplary embodiment.

The following describes a distributed processing method in the first exemplary embodiment using FIGS. 8 and 9. FIG. 8 is a view illustrating an operation example of the distributed processing system 1 in the first exemplary embodiment.

In the distributed processing system 1, the master device 10 stores information of each slave device 20 in the slave information storage unit 11 for communication with each slave device 20 (S81). For example, a machine name and an IP address of each slave device 20 are stored in the slave information storage unit 11 as follows.
Node_A, 192.168.0.2
Node_B, 192.168.0.3
Node_C, 192.168.0.4
Node_D, 192.168.0.5
Node_E, 192.168.0.6
Node_F, 192.168.0.7

The master device 10 starts up the slave device 20 based on the information stored in the slave information storage unit 11 (S82). Upon reception of the start-up request from the master device 10, the slave devices 20 are started up (S83). In the above example, six slave devices 20 from the Node_A to Node_F are started up. The slave devices 20 may be started up independently irrespective of the request from the master device 10; in this case, step (S82) is omitted.

The master device 10 acquires the distributed processing execution request (S84). The execution request includes, for example, the following information.
Distributed processing program/home/userA/modified_ipm
Number of Processes to be Activated: 8

The master device 10 determines, in response to the execution request, the slave devices 20 to activate a process for the distributed processing and the number of processes to be activated in each of the slave devices 20 and transmits the distributed processing execution instruction to the slave devices 20 determined as target devices (S85). For example, the master device 10 determines the above-mentioned six slave devices 20 as the target devices and determines the number of processes in each of the slave devices 20 as follows.
Node_A, number of processes=2
Node_B, number of processes=2
Node_C, number of processes=1
Node_D, number of processes=1
Node_E, number of processes=1
Node_F, number of processes=1

The master device 10 transmits, together with the execution instruction, information of the distributed processing program, information of the slave devices 20 determined as the distributed processing target devices, the number of processes in each of the slave devices 20, and the like to the slave devices 20.

Upon reception of the distributed processing execution instruction, the slave device 20 stores the information of the slave devices 20 acquired together with the execution instruction in the slave information storage unit 24 (S86).

Subsequently, the slave device 20 acquires the distributed processing program based on the information acquired together with the execution instruction (S87). For example, when a home directory is shared by an NFS (Network File System) or the like, each slave device 20 acquires a distributed processing program (/home/userA/modified_ipm) through network access.

Each slave device 20 executes the acquired distributed processing program as many times as the specified number of processes (S88). In the above example, the slave devices 20 of the Node_A and Node_B each activate two processes 25, and the other slave devices 20 each activate one process 25. The local collective communication is executed in each process 25 activated based on the distributed processing program. Operation to be performed in each process 25 will be described later. After completion of each process 25, each slave device 20 transmits a result of the distributed processing performed by each process 25 to the master device 10.

The master device 10 receives the distributed processing result from each slave device 20 and outputs result data (S89). An output form of the result data is not limited and, for example, the result data can be output from a display unit, other output devices (printer, etc.), and the like, through the input/output I/F 4.

The master device 10 transmits a stop request to each slave device 20 (S90). Upon reception of the stop request, each slave device 20 stops (S91). The stop of each slave device 20 may be shutdown or transition to a predetermined operation mode such as a power saving mode. Further, each slave device 20 may stop independently irrespective of the request from the master device 10; in this case, step (S90) is omitted.

FIG. 9 is a flowchart illustrating an operation example of each process 25 in the first exemplary embodiment. Based on the example of FIG. 7, it is assumed here that the processes are activated as follows.
Node_A: process N1
Node_A: process N2
Node_B: process N3
Node_B: process N4
Node_C: process N5
Node_D: process N6
Node_E: process N7
Node_F: process N8

After being activated, the process 25 selects one partitioning pattern from the plurality of retained partitioning patterns (S95). The plurality of processes 25 are generated based on the same distributed processing program and, therefore, select the same partitioning pattern. It is assumed here that each process 25 retains the partitioning patterns C-1 and C-2 illustrated in FIG. 7 and a selection order of alternately selecting the partitioning patterns C-1 and C-2 in a repetitive manner. According to this assumption, the process 25 first selects the partitioning pattern C-1.

Subsequently, the process 25 acquires information related to the selected partitioning pattern (S96). The information acquired here includes information of the other process 25 which belongs to the same process group as the process 25 and which is a communication partner with which the process 25 executes the local collective communication and a method for realizing the local collective communication. Roles (data transmission, data reception, whether or not to perform predetermined computation, and the like) of the respective processes 25 are provided by the method for specifically realizing the local collective communication.

Assuming that the process 25 is the process N1 in the example of FIG. 7, the process N1 acquires the machine names, IP addresses, and the like of the respective processes N2 to N4 belonging to the same process group. Further, for example, the process N1 recognizes that it has a role of collecting data from the other processes N2 to N4, performing predetermined computation for the collected data, and delivering a result of the computation to the other processes N2 to N4 in the local collective communication.

Based on the information related to the partitioning pattern, the process 25 executes the local collective communication among the plurality of processes 25 within the same process group corresponding to the partitioning pattern selected in step (S95) (S97). According to the example of FIG. 7, the local collective communication is executed among the processes N1 to N4, and another local collective communication is executed among the processes N5 to N8.

After completion of the local collective communication, the process 25 determines whether or not the number of execution steps (execution number of times) of the local collective communication reaches a predetermined number of steps (predetermined number of times) (S98). The predetermined number of steps indicates the number of times by which the computation result data reflecting all the pieces of target data that the processes 25 have can be shared among all the processes 25. When the predetermined number of steps is completed (YES in S98), the process 25 ends its processing. On the other hand, when the predetermined number of steps is not completed (NO in S98), the process 25 returns to step (S95) and continues its processing.

In a next step (S95), the process 25 selects a partitioning pattern different from the previously selected partitioning pattern based on information of the retained selection order. According to the example of FIG. 7, the process 25 selects the partitioning pattern C-2. Thus, in a next step, the local collective communication is executed among the processes N3 to N6, and another local collective communication is executed among the remaining processes.

Functions and Effects in First Exemplary Embodiment

As described above, in the first exemplary embodiment, like the distributed processing device and distributed processing method in the above-described exemplary embodiment, the local collective communication is executed among the processes within each of the process groups obtained by partitioning all the processes based on the selected partitioning pattern. That is, in the first exemplary embodiment, a plurality of local collective communications are executed in parallel, and the number of processes to participate in each local collective communication is reduced as compared to a case where the collective communication is executed among all the processes.

Thus, according to the first exemplary embodiment, it is possible to distribute a communication load accompanied by the collective communication, thus making it possible to prevent communication accompanied by the collective communication from becoming a bottleneck to hinder high-speed operation of the distributed processing. As a result, according to the first exemplary embodiment, it is possible to realize high-speed operation of the distributed processing accompanied by the collective communication.

Further, in the first exemplary embodiment, each process 25 for the distributed processing activated in each slave device 20 retains the plurality of partitioning patterns and the selection order of the plurality of the partitioning patterns. The selection order is a selection order which allows the data reflecting the pieces of target data that all the processes have to be shared among all the processes after repetition of a predetermined number of times of the local collective communication. And, in the first exemplary embodiment, the local collective communication in each step is executed based on the partitioning pattern selected based on these pieces of information.

Thus, according to the first exemplary embodiment, the number of repetitions of the local collective communication is reduced, thereby making it possible to prevent a reduction in processing speed due to an increase in the number of repetitions. Further, according to the first exemplary embodiment, a desired distributed processing result can be obtained even when the number of repetitions of the local collective communication is reduced.

Second Exemplary Embodiment

In a second exemplary embodiment, the slave device 20 to activate the process 25 and the number of processes to be activated in each thereof are determined based on the number of processor cores of each slave device 20 and a network to which each slave device 20 is connected. Hereinafter, the distributed processing system 1 in the second exemplary embodiment will be described focusing on points different from the first exemplary embodiment. In the following description, the same points as the first exemplary embodiment are appropriately omitted.

Device Configuration

The slave information storage unit 11 stores therein, in addition to the information described in the first exemplary embodiment, the number of processor cores of each slave device 20 and connected network information of each slave device 20. The connected network information is information capable of distinguishing between network segments or Ethernet® to which each slave device 20 is connected. Thus, the same connected network information is set in the slave devices 20 belonging to the same network segment.

The execution instruction unit 14 selects, based on the information stored in the slave information storage unit 11, the slave devices 20 to execute the distributed processing preferentially in the descending order of the total number of the processor cores for the network to which each slave device 20 is connected and the number of processor cores in each slave device 20. Further, the execution instruction unit 14 determines, in accordance with the number of processor cores, the number of processes to be activated in the selected slave device 20. Thus, the execution instruction unit 14 can be referred to as a target determination means. The execution instruction unit 14 transmits, to the thus selected slave device 20, an execution instruction including the connected network information related to the slave device 20 to participate in the distributed processing, the number of processor cores, and determined number of processes.

Figure 10:
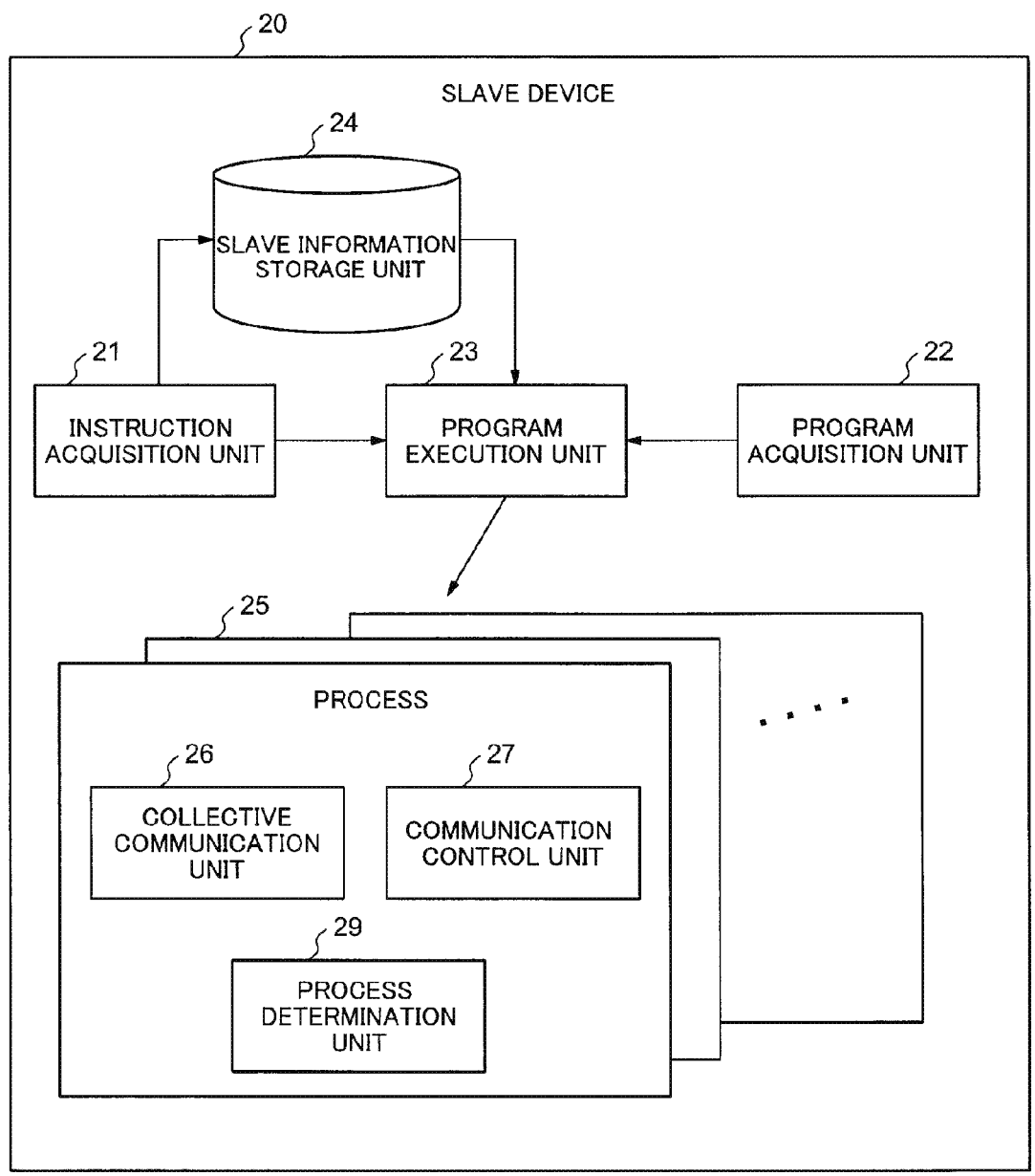
FIG. 10 is a view conceptually illustrating a configuration example of the slave device in a second exemplary embodiment.

FIG. 10 is a view conceptually illustrating a configuration example of the slave device 20 in the second exemplary embodiment. As illustrated in FIG. 10, the slave device 20 in the second exemplary embodiment includes, in addition to the configuration of the first exemplary embodiment, a process determination unit 29. The process determination unit 29 is realized by execution of the distributed processing program and can thus be referred to also as a process determination means.

The process determination unit 29 determines which one of the processes 25 included in the partitioning pattern selected first by the communication control unit 27 own process 25 corresponds. The process determination unit 29 makes the above determination, based on the information related to the slave device 20 to participate in the distributed processing, which is received together with the execution instruction from the master device 10, so as to minimize the occurrence of the communication as much as possible in the local collective communication and so as to minimize latency of the communication as much as possible. The determination method by the process determination unit 29 will be concretely described later using FIG. 11.

Operation Example

Figure 11:
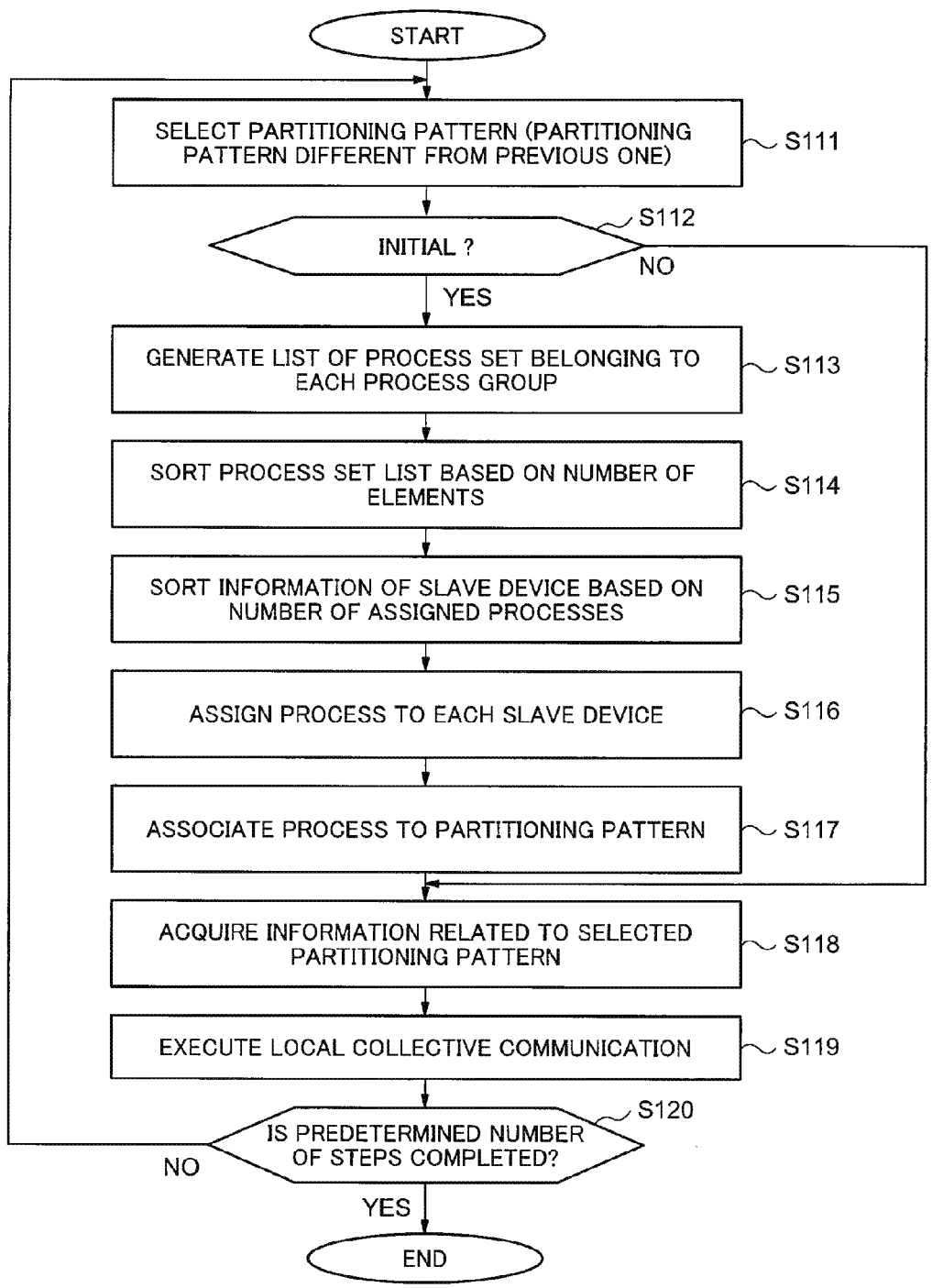
FIG. 11 is a flowchart illustrating an operation example of each process in the second exemplary embodiment.

The following describes an operation example of the distributed processing system 1 in the second exemplary embodiment using FIGS. 8 and 11.

In the second exemplary embodiment, in step (S81), the master device 10 stores the following pieces of information in the slave information storage unit 11.
Node_A, 192.168.0.2, number of cores (4), network A
Node_B, 192.168.0.3, number of cores (2), network B
Node_C, 192.168.0.4, number of cores (2), network C
Node_D, 192.168.0.5, number of cores (2), network A
Node_E, 192.168.0.6, number of cores (1), network A
Node_F, 192.168.0.7, number of cores (2), network A
Node_G, 192.168.0.8, number of cores (4), network B In step (S84), the master device 10 acquires the distributed processing program execution request including the following information.
Distributed processing program:/home/userA/modified_ipm
Number of Processes to be Activated: 8

In step (S85), the master device 10 selects the slave device 20 to be a transmission destination of the distributed processing execution request as follows. The master device 10 acquires the above information from the slave information storage unit 11, computes a total sum of the processor cores for each connected network, and sorts the connected networks in the descending order of the total value. According to the above example of the slave information, the following list is computed.
Network A: number of cores (9)
Network B: number of cores (6)
Network C: number of cores (2)

Further, the master device 10 selects the network preferentially from the top of the above list so as to satisfy the number (8) of processes to be activated, which is specified in the execution request. According to the above example, only the network A that satisfies the number (8) of processes to be activated is selected. This allows the slave device 20 connected to the same network with less latency to be preferentially selected.

The master device 10 preferentially selects, among the slave devices 20 that satisfy the number (8) of processes to be activated, the slave device 20 which is connected to the selected network A in the descending order of the number of the processor cores. According to the above example, the following three slave devices 20 are selected. This allows the slave device 20 that minimizes the occurrence of the inter-node communication as much as possible to be preferentially selected.
Node_A, 192.168.0.2, number of cores (4), network A
Node_D, 192.168.0.5, number of cores (2), network A
Node_F, 192.168.0.7, number of cores (2), network A The master device 10 determines the thus selected slave devices 20 as the slave devices 20 to participate in the distributed processing and further determines the number of processes to be executed in each of the slave devices 20 in accordance with the number of cores in each slave device 20. In the above example, the number of processors of the slave device 20 of Node_A is determined to be four, the number of processors of the slave device 20 of Node_D is determined to be two, and the number of processors of the slave device 20 of Node_F is determined to be two.

The master device 10 transmits, to the thus selected slave devices 20, the distributed processing execution instruction, together with the number of processes (S85). The selection method as described above allows the slave devices 20 that minimize the occurrence of the inter-node communication as much as possible and minimize the communication latency to be selected as the devices to participate in the distributed processing.

FIG. 11 is a flowchart illustrating an operation example of each process 25 in the second exemplary embodiment. It is assumed here that the partitioning patterns C-1 and C-2 illustrated in FIG. 7 and the selection order of alternately selecting the partitioning patterns C-1 and C-2 in a repetitive manner are retained in each process 25.

After being activated, the process 25 selects one partitioning pattern from the plurality of retained partitioning patterns (S111). According to the above assumption, each process 25 selects the partitioning pattern C-1.

Subsequently, the process 25 operates as follows when the current local collective communication is the initial local collective communication (YES in S112). The process 25 generates a list of a set of processes related to each of the process groups generated according to the selected partitioning pattern (S113). According to the example of FIG. 7, the following process set list is generated.
(Process Set List)
{process N1, process N2, process N3, process N4}
{process N5, process N6, process N7, process N8}

The process 25 sorts the process set list related to each of the process groups in the descending order of the number of elements (processes) (S114). In the example of FIG. 7, both the process sets have the same number of (four) elements, so that the sort results are the same.

Figure 12:
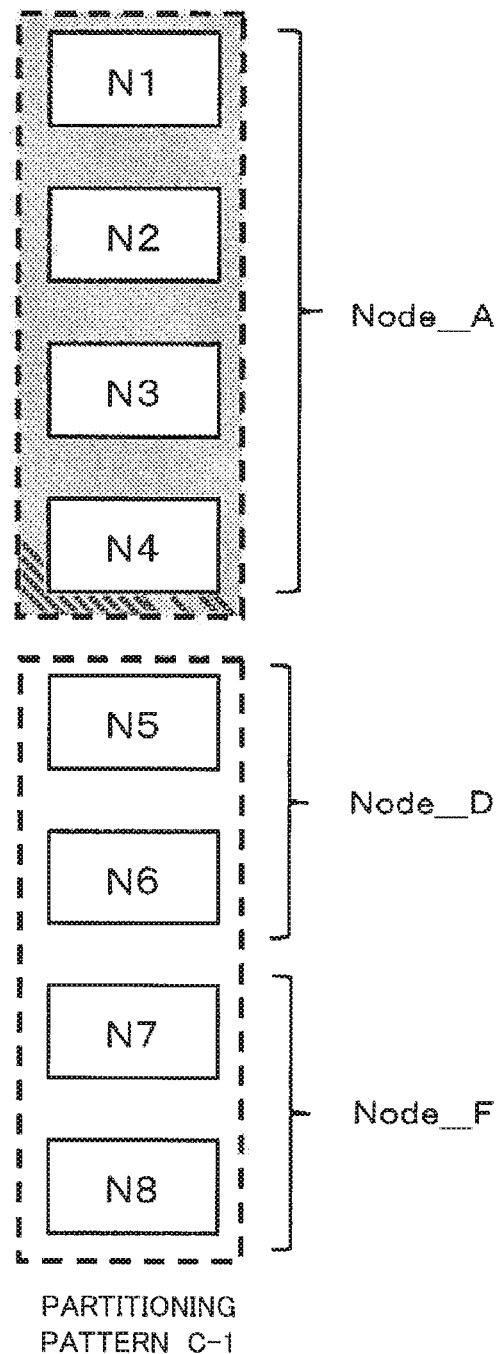
FIG. 12 is a view conceptually illustrating an example of a process assignment in the second exemplary embodiment.

The process 25 sorts information pieces of the respective slave devices 20 in the descending order of the number of processes to be activated, which is specified by the master device 10 (S115).
(Slave Device List)
Node_A, 192.168.0.2, number of processes (4), network A
Node_D, 192.168.0.5, number of processes (2), network A
Node_F, 192.168.0.7, number of processes (2), network A The process 25 preferentially assigns the process included in the higher-order process set in the process set list to the higher-order slave device 20 in the slave device list in order (S116). According to the example of FIG. 7, an assignment illustrated in FIG. 12 is determined. FIG. 12 is a view conceptually illustrating an example of a process assignment in the second exemplary embodiment.

The process 25 recognizes, based on the assignment result and information of the slave device 20 in which the own process is activated, to which one of processes in the partitioning pattern the own process corresponds (S117). In the example of FIG. 7, the process 25 activated in the slave device 20 of Node_D recognizes, based on the assignment result illustrated in FIG. 12, that the own process corresponds to the process N5 or process N6 in the partitioning pattern C-1.

Subsequently, based on a result of the recognition, the process 25 acquires information related to the selected partitioning pattern (S118).

Based on the acquired information, the process 25 executes the local collective communication among the plurality of processes 25 in the same process group corresponding to the partitioning pattern selected in step (S111) (S119). In the local collective communication in the partitioning pattern C-1, a communication occurs only between the slave device 20 of Node_D and slave device 20 of Node_F.

On the other hand, when the current local collective communication is not the initial local collective communication (NO in S112), the process 25 does not execute processing from step (S113) to step (S117). This is because that a recognition of corresponding to which process in the partitioning pattern an own process has been already completed. Subsequently, step (S120) which is the same processing as step (S98) of FIG. 9 in the first exemplary embodiment is executed.

Functions and Effects in Second Exemplary Embodiment

As described above, in the second exemplary embodiment, the slave device 20 to participate in the distributed processing and the number of processors to be activated in each thereof are determined based on the number of processor cores of each slave device 20 and network to which each slave device 20 is connected. Then, each process 25 is associated with the partitioning pattern initially selected. The above determination and association are executed such that the local collective communication is executed on a multi-core processor in the same slave device 20 as much as possible and executed among the slave devices 20 connected to the same network as much as possible.

Thus, according to the second exemplary embodiment, control is performed so as to minimize the occurrence of the communication as much as possible even in each local collective communication and so as to minimize latency of the communication, thereby making it possible to realize high-speed operation of the distributed processing accompanied by the collective communication.

The above first exemplary embodiment will be described more in detail below, using examples.

Example

Figure 13:
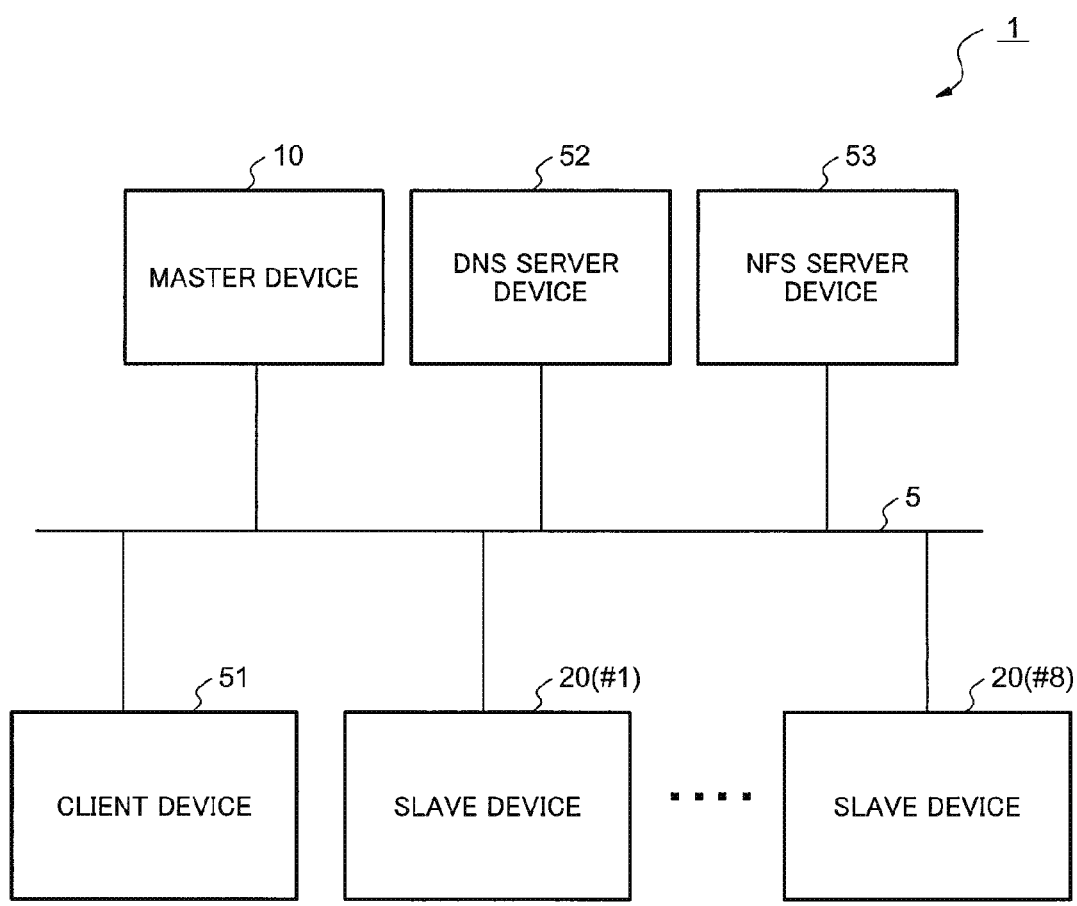
FIG. 13 is a view conceptually illustrating a configuration of the distributed processing system in an example.

FIG. 13 is a view conceptually illustrating a configuration of the distributed processing system 1 in an example. The distributed processing system 1 includes, in addition to the devices (master device 10 and slave device 20) described in the above exemplary embodiments, a DNS server device 52, an NFS server device 53, and a client device 51. In the present example, the communication network 9 is realized as a LAN. Further, the number of the slave devices 20 is eight. The client device 51, DNS server device 52, and NFS server device 53 are each a so-called computer, like the master device 10 and slave device 20.

The master device 10, slave device 20, and client device 51 each mount a home directory of the NFS server device 53, so that the master device 10 and slave device 20 can access a file that the client device 51 stores in the NFS server device 53.

In the present example, it is assumed that a machine name of the master device 10 is MAT1 and that machine names of the eight slave devices 20 are SLV1 to SLV8, respectively.

When the computers perform communication with each other, they perform name resolution of the machine name MAT1 using a DNS service provided by the DNS server device 52 to thereby acquire a corresponding IP address.

The machine names SLV1 to SLV8 of the slave devices 20 are stored in the slave information storage unit 11 of the master device 10. The eight slave devices 20 are in an activated state. In this state, a user operates the client device 51 to thereby transmit the distributed processing program execution request to the master device 10.

In the present example, the following information is transmitted, together with the execution request.
Distributed Processing Program:/home/userA/sperceptron
Number of Processes to be Activated: 8

The distributed processing program is a distributed learning program for the following structured perceptron.
(distributed processing program:/home/userA/sperceptron)
1. w=0// weight vector initialization
2. Data={(x1, y1), (x2, y2), . . . (xn, yn)}
// data reading (x is feature, y is label)
3. For i=1: Max//repeat the following (1) and (2) "Max" number of times
(1) For each (x,y) in Data
  a) when current estimation is wrong, update w
(2) w=PseudoAllreduce (w,i,4)
  //Allreduce (local collective communication) in units of four devices
4. w=Allreduce (w)/n Upon reception of the above execution request from the client device 51, the master device 10 acquires, from the slave information storage unit 11, the machine names SLV1 to SLV8 of the slave devices 20 that can be activated. The number 8 of the processes to be activated is specified in the execution request, so that the master device 10 makes each slave device 20 activate one process. Specifically, the master device 10 accesses each of the eight slave devices 20 and transmits thereto a location at which the distributed processing program exists and machine names (SLV1 to SLV8) of the slave devices 20 to execute the distributed processing program.

The slave device 20 stores, in the slave information storage unit 24, the machine names of the slave devices 20 which are transmitted, together with the execution instruction, from the master device 10. Then, the slave devices 20 each read out the distributed processing program from "/home/userA/sperceptron" and execute the program. As a result, one process that performs distributed learning processing for structured perceptron is activated in each slave device 20.

In the present example, the following correspondence relation is realized between the slave devices 20 and processes.
SLV1: process N1
SLV2: process N2
SLV3: process N3
SLV4: process N4
SLV5: process N5
SLV6: process N6
SLV7: process N7
SLV8: process N8

As described above, the distributed processing program performs repetitive computations "Max" number of times. Each time the computation is repeated, PseudoAllreduce is executed. The execution of the PseudoAllreduce in the example corresponds to the collective communication unit 26. As an argument of the collective communication unit 26, the number i of the repetition and the number (m=4) of the devices among which the local collective communication is executed are provided.

The communication control unit 27 retains information of the partitioning patterns C-1 and C-2 illustrated in FIG. 7 and selection order of alternately selecting the partitioning patterns C-1 and C-2 in a repetitive manner. The communication control unit 27 determines whether to select the partitioning pattern C-1 or partitioning pattern C-2 of FIG. 7 based on whether a value of the argument i is an even number or an odd number. For example, when the argument i is 1, the partitioning pattern C-1 is selected.

As a result, the local collective communication when the argument i is 1 is executed among the slave devices 20 of SLV1 to SLV4 and among the slave devices 20 of SLV5 to SLV8. In a next step (when the argument i is 2), the local collective communication is executed among the slave devices 20 of SLV1, SLV2, SLV7, and SLV8 and among the slave devices 20 of SLV3 to SLV6.

Modification

Although the local collective communication is repeated by a predetermined number of steps in the above exemplary embodiments, the repetition of the local collective communication may be terminated depending on a result of the local collective communication (local processing data).

Figure 14:
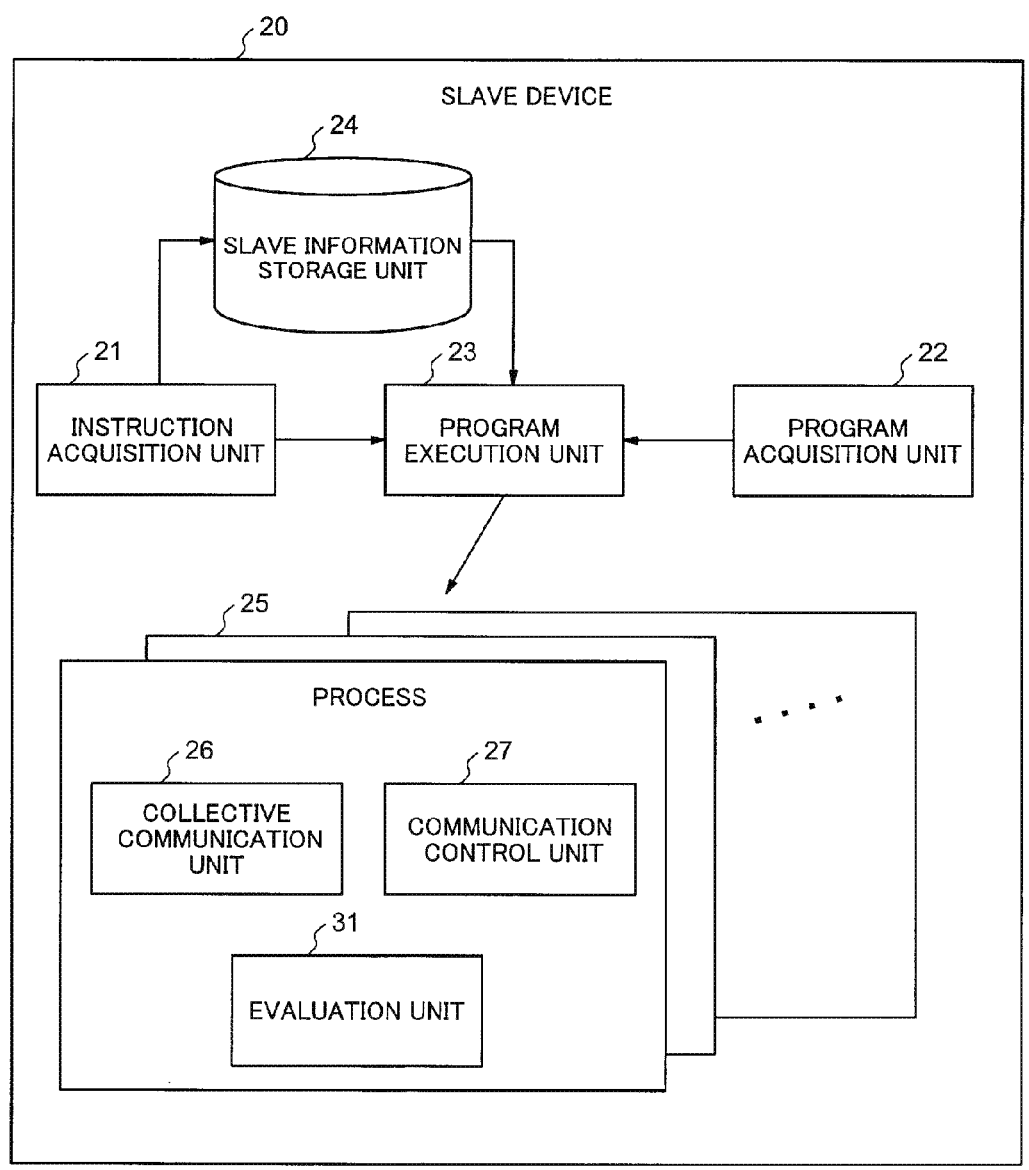
FIG. 14 is a view conceptually illustrating a configuration example of the slave device in a modification.

FIG. 14 is a view conceptually illustrating a configuration example of the slave device 20 in the modification. In the slave device 20 in this modification, the process 25 includes, in addition to the configuration of the above first or second exemplary embodiment, an evaluation unit 31. The evaluation unit 31 is realized by execution of the distributed processing program and can therefore be referred to also as an evaluation means.

The evaluation unit 31 evaluates data based on a result (local processing data) of the local collective communication. The evaluation unit 31 may evaluate the result itself of the local collective communication or data obtained by applying processing to the result of the local collective communication. For example, when a difference between a result of the previous local collective communication and a result of the current local collective communication is smaller than a predetermined threshold, the evaluation unit 31 evaluates that the local processing data satisfies a desired level. Further, the evaluation unit 31 may have a predetermined evaluation function and, in this case, the evaluation unit 31 may evaluate that the local processing data satisfies a desired level based on a result obtained by giving the local processing data to the evaluation function.

The communication control unit 27 determines whether or not to continue the process depending on a result of the evaluation made by the evaluation unit 31. By this determination, whether or not a next local collective communication is executed by the collective communication unit 26 can be determined. When the evaluation result of the evaluation unit 31 indicates that the local processing data satisfies the desired level, the communication control unit 27 ends the process. As a result, processing of the collective communication unit 26 is not executed. On the other hand, when the evaluation result of the evaluation unit 31 indicates that the local processing data does not satisfy the desired level, the communication control unit 27 continues the process. As a result, the collective communication unit 26 executes the next local collective communication.

According to the modification, it is possible to further reduce the number of repetitions of the local collective communication, thereby making it possible to realize high-speed operation of the distributed processing accompanied by the collective communication.

Further, although the number of processes in each process group is the same in all the partitioning patterns in the above exemplary embodiments, as illustrated in the examples of FIGS. 5, 6, and 7, it may be different among the partitioning patterns.

As the local collective communication is repeated, the number of pieces of data reflected in the local processing data increases, thus increasing proficiency of the local processing data. That is, generally, in order to make the local processing data reach a desired level, a larger amount of information is required in a later stage of the repetition than in an early stage thereof. Thus, in the later stage of the repetition, the communication control unit 27 may select the partitioning pattern having a larger number of processes in each process group than the number of processes in each process group in the partitioned group selected in the early stage of the repetition.

In this case, the communication control unit 27 may retain a plurality of partitioning patterns having a different number of processes in each process group and select the partitioning pattern to be used in a next local collective communication from among the plurality of partitioning patterns depending on the evaluation result from the evaluation unit 31. Further, the communication control unit 27 may previously retain a selection order in which the number of processes in each process group increases in the later stage of the repetition. In this case, according to the selection order, the communication control unit 27 may select, as the partitioning pattern for a next local collective communication, the partitioning pattern having a larger number of processes in each process group than the number of processes in each process group in the partitioning pattern used for the previous local collective communication.

According to the modification, it is possible to make the result of the local collective communication quickly reach a desired level, thereby further reducing the number of repetitions of the local collective communication, which in turn can realize high-speed operation of the distributed processing accompanied by the collective communication.

Further, the communication control unit 27 retains a plurality of partitioning patterns in the above exemplary embodiments; however, the partitioning pattern to be used for a next local collective communication may be dynamically determined. Specifically, a configuration is possible, in which the communication control unit 27 of each process 25 transmits the local processing data of each process 25 to the master device 10, and the master device 10 dynamically determines the partitioning pattern based on the collected local processing data. Then, in this case, the communication control unit 27 of each process 25 may use the determined partitioning pattern for the next local collective communication.

Although both the number of processor cores of each slave device 20 and network to which each slave device 20 is connected are taken into consideration in the above second exemplary embodiment, the slave device 20 to participate in the distributed processing may be selected based on any one of the number of processor cores of each slave device 20 and network to which each slave device 20 is connected. In this case, the slave information storage unit 11 of the master device 10 may store, for each slave device 20, only one of the number of processor cores and connected network information, and the execution instruction unit 14 of the master device 10 may preferentially select the slave device 20 connected to the same network or slave device 20 having a larger number of processor cores. Even in this configuration, control is performed so as to minimize the occurrence of the communication in each local collective communication and so as to minimize latency of the communication, thereby making it possible to realize high-speed operation of the distributed processing accompanied by the collective communication.

Although a plurality of steps (processing) are described in order in each of the plurality of flowcharts used in the above description, an execution order of the steps executed in each of the present exemplary embodiments is not limited to the described order. In each of the present exemplary embodiments, the order of the illustrated steps may be changed within the scope not causing any problem. Further, the above exemplary embodiments and modifications may be combined variously within the scope not causing a conflict.

This application claims priority based on the Japanese Patent Application No. 2012-168698 filed on Jul. 30, 2012 and the disclosure of which is hereby incorporated in its entirety.

While the present invention has been described with reference to the exemplary embodiments and examples, the present invention is not limited to the above-mentioned exemplary embodiments or examples. Various changes, which a person skilled in the art can understand, can be added to the composition and the details of the invention of the present application in the scope of the invention of the present application.

What is claimed is:

1. A distributed processing device that activates at least one of a plurality of processes activated by a plurality of distributed processing devices, said distributed processing device comprising:
at least one non-transitory memory operable to store program code; and
at least one processor operable to read said program code and operate as instructed by said program code, said program code including:
collective communication code that causes said at least one processor to execute local collective communication among the plurality of processes within one process group among a plurality of process groups generated by partitioning said plurality of processes activated by the plurality of distributed processing devices by a first partitioning pattern; and
communication control code that causes said at least one processor to select, after the local collective communication, a second partitioning pattern different from said first partitioning pattern used in said local collective communication, and allowing said collective communication code to execute a next local collective communication using data based on a result of said local collective communication among the plurality of processes within said one process group among the plurality of process groups generated by partitioning said plurality of processes activated by the plurality of distributed processing devices by said second partitioning pattern,
wherein after said local collective communication is repeated a predetermined number of times, said communication control code further causes said at least one processor to retain such a selection order of a plurality of partitioning patterns including said first and second partitioning patterns as to allow data reflecting a plurality of pieces of target data that said plurality of processes have to be shared among said plurality of processes and select a partitioning pattern to be used for said next local collective communication based on said selection order.

2. The distributed processing device according to claim 1, wherein said program code further includes evaluation code that causes said at least one processor to evaluate the data based on said result of said local collective communication, wherein said communication control code further causes said at least one processor to determine, depending on an evaluation result from said evaluation code, whether or not to allow said collective communication code to cause said at least one processor to execute said next local collective communication.

3. The distributed processing device according to claim 1, wherein said program code further includes evaluation code that causes said at least one processor to evaluate the data based on said result of said local collective communication, wherein said communication control code further causes said at least one processor to select the partitioning pattern to be used for said next local collective communication based on the evaluation result from said evaluation code.

4. The distributed processing device according to claim 1, wherein said communication control code further causes said at least one processor to select, as said second partitioning pattern, a partitioning pattern having a larger number of processes in each process group than a number of processes in said each process group in said first partitioning pattern.

5. A distributed processing system comprising:
a plurality of distributed processing devices as claimed in claim 1; and
a distributed processing management device including:
an information storage that stores, for said each distributed processing device, at least one of a number of processor cores and connected network information;
at least one non-transitory memory operable to store program code; and
at least one processor operable to read said program code and operate as instructed by said program code, said program code including:
execution target determination code that causes said at least one processor to preferentially select a distributed processing device that activates at least one of said plurality of processes activated by the plurality of distributed processing devices from at least one of a distributed processing device having the same said connected network information and a distributed processing device having a larger number of said processor cores; and
execution instruction code that causes said at least one processor to transmit an execution instruction of said process to the distributed processing device selected by said execution target determination code.

6. A distributed processing system comprising:
a plurality of distributed processing devices as claimed in claim 1; and
a distributed processing management device including:
an information storage that stores, for said each distributed processing device, each of a number of processor cores and connected network information;
at least one non-transitory memory operable to store program code; and
at least on processor operable to read said program code and operate as instructed by said program code, said program code including:

target determination code that causes said at least one processor to preferentially select a distributed processing device that activates at least one of said plurality of processes activated by the plurality of distributed processing devices from a distributed processing device having a larger total number of processor cores for each connected network and a larger number of processor cores and determines, in accordance with said larger number of processor cores, a number of processes to be activated in said distributed processing device; and execution instruction code that causes said at least one processor to transmit an execution instruction of said process including the number of processes determined by said target determination code to the distributed processing device selected by said target determination code.

7. A distributed processing method that is executed on a computer that activates at least one of a plurality of processes activated by a plurality of computers, comprising:

executing a local collective communication among the plurality of processes within one process group among a plurality of process groups generated by partitioning said plurality of processes activated by the plurality of computers by a first partitioning pattern;

selecting, after said local collective communication, a second partitioning pattern different from said first partitioning pattern used in said local collective communication; and executing, using data based on a result of said local collective communication, a next local collective communication among a plurality of processes within one process group among the plurality of process groups generated by partitioning said plurality of processes by said second partitioning pattern, wherein selection of said second partitioning pattern is made, after said local collective communication is repeated a predetermined number of times, based on such a selection order of a plurality of partitioning patterns including said first and second partitioning patterns as to allow data reflecting a plurality of pieces of target data that said plurality of processes activated by the plurality of computers have to be shared among said plurality of processes activated by the plurality of computers.

8. The distributed processing method according to claim 7, further comprising:

evaluating the data based on said result of said local collective communication; and determining, depending on the result of said evaluating, whether or not to allow execution of said next local collective communication.

9. The distributed processing method according to claim 7, further comprising evaluating the data based on said result of said local collective communication, wherein the selection of said second partitioning pattern is made based on said evaluating.

10. The distributed processing method according to claim 7, wherein in selection of said second partitioning pattern, a partitioning pattern having a larger number of processes in each process group than a number of processes in said each process group in said first partitioning pattern is selected as said second partitioning pattern.

11. The distributed processing method according to claim 7, wherein said computer or another computer refers to information storage unit that stores, for said each computer, at least one of a number of processor cores and connected network information, preferentially selects, as a computer that activates at least one of said plurality of processes activated by the plurality of computers, one of a computer having the same said connected network information and a computer having a larger number of said processor cores, and transmits an execution instruction of said process to the selected computer.

12. The distributed processing method according to claim 7, wherein said computer or another computer refers to information storage unit that stores, for said each computer, at least one of a number of processor cores and connected network information, preferentially selects, as a computer that activates at least one of said plurality of processes activated by the plurality of computers, a computer having a larger total number of processor cores for each connected network and a larger number of processor cores, determines, in accordance with said number of processor cores, a number of processes to be activated in said computer; and transmits an execution instruction of said process including said determined number of processes to said the selected computer.

13. A non-transitory computer-readable recording medium having embodied thereon a program allowing a computer to execute the distributed processing method as claimed in claim 7.

14. A distributed processing device that activates at least one of a plurality of processes activated by a plurality of distributed processing devices wherein said at least one of the plurality of processes comprises:

collective communication means for executing local collective communication among a plurality of processes activated by the plurality of distributed processing devices within one process group among a plurality of process groups generated by partitioning said plurality of processes by a first partitioning pattern; and communication control means for selecting, after the local collective communication, a second partitioning pattern different from said first partitioning pattern used in said local collective communication, and allowing said collective communication means to execute a next local collective communication using data based on a result of said local collective communication among the plurality of processes within one process group among the plurality of process groups generated by partitioning said plurality of processes by said second partitioning pattern, wherein after said local collective communication is repeated a predetermined number of times, said communication control means is further for retaining such a selection order of a plurality of partitioning patterns including said first and second partitioning patterns as to allow data reflecting a plurality of pieces of target data that said plurality of processes have to be shared among said plurality of processes and selecting a partitioning pattern to be used for said next local collective communication based on said selection order.

* * * * *